(12) United States Patent
Ghorpade et al.

(10) Patent No.: US 12,373,309 B2
(45) Date of Patent: Jul. 29, 2025

(54) PROVIDING STATUS NOTIFICATIONS OF FILE-COPY OPERATIONS TO BACKUP CLIENTS

(71) Applicant: Dell Products L.P., Round Rock, TX (US)

(72) Inventors: Nachiket Vilasrao Ghorpade, Pune (IN); Viral Kirtikumar Mehta, JamKhambhalia (IN); Donna Barry Lewis, Holly Springs, NC (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/188,776

(22) Filed: Mar. 23, 2023

(65) Prior Publication Data

US 2024/0320104 A1   Sep. 26, 2024

(51) Int. Cl.
  *G06F 11/14* (2006.01)
(52) U.S. Cl.
  CPC ...... *G06F 11/1466* (2013.01); *G06F 11/1438* (2013.01); *G06F 11/1451* (2013.01)
(58) Field of Classification Search
  CPC ............. G06F 11/1466; G06F 11/1438; G06F 11/1451
  See application file for complete search history.

(56) References Cited

U.S. PATENT DOCUMENTS

| | | | | |
|---|---|---|---|---|
| 9,391,865 | B1 * | 7/2016 | Thiam | G06F 11/2025 |
| 9,934,106 | B1 * | 4/2018 | Amarnath | G06F 11/1458 |
| 10,169,163 | B2 * | 1/2019 | Anglin | G06F 11/1469 |
| 10,430,293 | B1 * | 10/2019 | Skowronski | G06F 11/1458 |
| 2009/0049260 | A1 * | 2/2009 | Upadhyayula | G06F 3/0641 |
| | | | | 711/E12.001 |
| 2018/0074867 | A1 * | 3/2018 | Srivastava | G06F 9/543 |

FOREIGN PATENT DOCUMENTS

| | | | | |
|---|---|---|---|---|
| WO | WO-2012150814 | A2 * | 11/2012 | B41F 1/42 |
| WO | WO-2024124717 | A1 * | 6/2024 | B42F 2/43 |

* cited by examiner

*Primary Examiner* — Amine Riad
(74) *Attorney, Agent, or Firm* — Staniford Tomita LLP

(57) ABSTRACT

A client-side deduplication library receives from a backup application at a client a job request for a file-copy operation involving one or more files managed by a backup server. A server-initiated communication channel is established between the backup server and client-side deduplication library. A callback from the backup application specifying one or more types of status updates that the application wishes to receive is registered. The backup server is directed to start a job for the file-copy operation. A status update on the job is received over the server-initiated communication channel without having to prompt the backup server for the status update. If the status update is of the type that the backup application wishes to receive, the callback is called to notify the backup application of the status update. If not, the callback is not called.

19 Claims, 13 Drawing Sheets

PROVIDING STATUS NOTIFICATIONS OF FILE-COPY OPERATIONS TO BACKUP CLIENTS

TECHNICAL FIELD

The present invention relates generally to information processing systems, and more particularly to file-copy operations in large scale file systems.

BACKGROUND

File systems provide a way to organize data stored in a storage system and present that data to clients or client applications. A deduplicated file system is a type of file system that seeks to reduce the amount of redundant data that is stored. Generally, data that is determined to already exist on the storage system is not again stored. Instead, metadata including references is generated to point to the already stored data and allow for reconstruction. Using a deduplicated file system with a backup system can be especially attractive because backups often include large amounts of redundant data that do not have to be again stored thereby reducing storage costs.

A large scale file system may hold many millions of files. Often, there is a need to transfer files from one location to another location either within the same storage system or to a different storage system. For example, replication is a technique where files in a backup storage system are copied to another remote backup storage system for purposes of disaster recovery. Copying a large number of files or large amount of data can be time and compute-resource intensive—especially when a deduplicated file system is involved given the data structures and other techniques involved with deduplicating data. Generally, users want to be kept apprised of the progress. In a conventional approach, the client backup application that submitted the request uses a polling technique to repeatedly query the backup server about status throughout the operation. Polling consumes resources on the server-side since the backup server must divert resources that might otherwise be used for the copying operation to respond to the polling request for status. Likewise, polling also consumes resources on the client-side as the backup application must maintain a thread to conduct the polling. There is a need for improved systems and techniques to provide status notifications during copy operations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
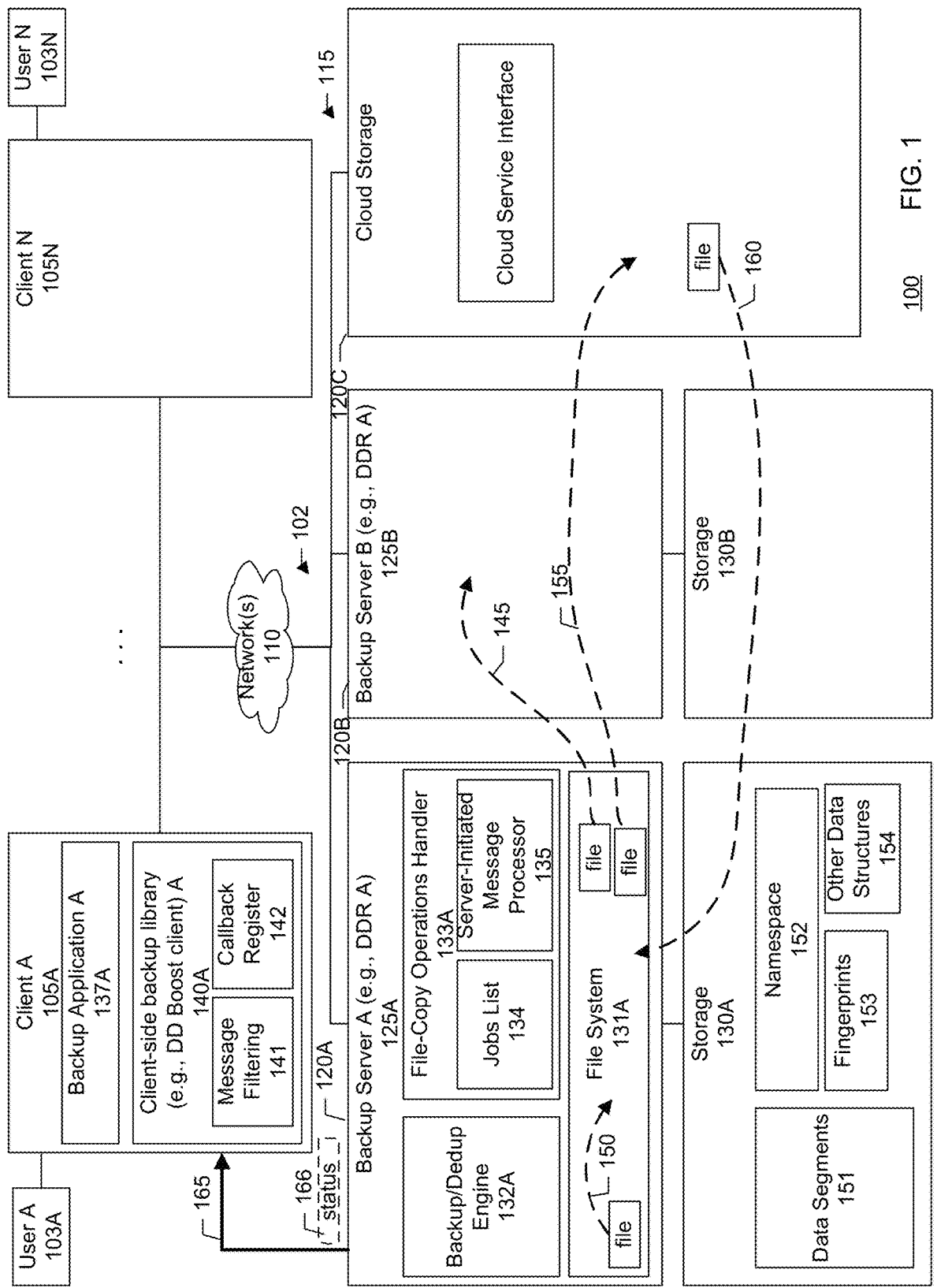
FIG. 1 shows a block diagram of an information processing system for sending status update notifications of file-copy operations in a deduplicated file system to a client backup application, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a simplified block diagram of an information processing system 100 within which methods and systems for providing status notifications of file copy operations to backup clients of a data protection or backup system 102 may be implemented. As shown in the example of FIG. 1, a set of users 103A-N are at a set of backup clients 105A-N which are connected via a network 110 to any number of backup storage systems 115.

The example shown in FIG. 1 includes first, second, and third backup storage systems 120A-C, respectively. The first backup storage system includes a first backup server 125A connected to a first storage 130A. The first backup storage system may be located within a data center of an organization or other enterprise. The first backup server includes a first file system 131A, first backup and deduplication engine 132A, and first file-copy operations handler 133A.

The file system provides a way to organize data stored in the storage system and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the file system is a deduplicated file system. An example of a deduplicated file system includes a Data Domain File System (DDFS) as provided by Dell Technologies of Round Rock, Texas. Deduplication involves splitting a file to be written to the storage system into a set of segments and comparing fingerprints of the segments against fingerprints corresponding to segments that have previously already been stored and are present at the storage system. Segments of the file having matching fingerprints are considered redundant and do not have to be again stored. Segments of the file that do not have matching fingerprints are considered new and are stored. Metadata including references is generated to allow the file to be reassembled. The backup and deduplication engine is responsible for managing the backup and deduplication of files or other user data from the clients to the backup storage system connected to the backup server.

The file-copy operations handler is responsible for managing requests for various file-copy operations that may be issued by a client to the backup server. In an embodiment, the file-copy operations handler includes a jobs list 134 and server-initiated message processor 135. The jobs list provides a buffer or queue to hold for processing jobs involving file-copy operations that have been requested by the client. The server-initiated message processor is responsible for sending status updates or notifications to the client concerning the progress of the file-copy operation jobs. In an embodiment, these status updates are sent by the backup server to the client without the client having to poll or prompt the backup server for updates. Further discussion is provided below.

The second backup storage system likewise includes a second backup server 125B connected to a second storage 130B. The second backup storage system may be similar to or identical to the first backup storage system as discussed above. The second backup storage system may be of the same model as the first backup storage system. The second backup storage system may be located in the same data center as the first backup storage system. Alternatively, the second backup storage system may be located at a location geographically remote from the first backup storage system. For example, the first backup storage system may be located in a data center in New York City, New York. The second backup storage system may be located in a data center in Las Vegas, Nevada.

The third backup storage system is a cloud storage service. The cloud storage service may be provided by a public cloud services provider. Some examples of cloud storage providers include Amazon Web Services (AWS) as provided by Amazon.com, Inc. of Seattle, Washington and Arlington, Virginia; Microsoft Azure storage as provided by Microsoft Corporation of Redmond, Washington; and others.

The various backup storage systems may be configured or arranged to provide replication, fail-over, disaster recovery, long-term retention, or combinations of these. For example, in an embodiment, the first backup server may be designated as a primary backup server, the second backup server may be designated as a secondary backup server, and the cloud storage system may be designated for long-term retention of backup files or other backup data. Client files and other data may be backed up from a client (e.g., client 105A) to the primary backup server. The files and other data may then be replicated from the primary backup server to the secondary backup server. Replication can help protect and safeguard files and other data from disasters. For example, if the primary backup server suffers a data loss event or other failure, a copy of the data may be retrieved by the secondary backup server. Cloud storage can be used for long-term retention of backup data. For example, government regulations may mandate that certain data such as financial records be retained for a period of years. Cloud storage can offer economical storage of data. Thus, backed up files requiring long-term retention may be copied or moved from the first backup server, second backup server, or both to cloud storage.

Installed at each (backup) client is a backup application 137A and client-side library 140A. The client-side library includes a message filtering module 141 and a callback register 142. The client-side library may be referred to as a client-side backup library or client-side deduplication library. The client-side library exposes an application programming interface (API) through which communications can be exchanged with the client backup application, processed, and forwarded to the backup server. For example, when the client backup application seeks to perform a backup or other file system operation, the application issues a call (e.g., API call) to the client-side library requesting the operation. The client-side library processes the request and issues to the appropriate backup server or cloud storage service a corresponding remote procedure call (RPC) for the request. The client-side library is positioned between the backup application and backup servers (including cloud storage).

The callback register is responsible for registering callbacks from the backup application that specify the type of status or progress notifications that the backup application wishes to receive concerning file-copy operations or jobs that have been submitted. The message filtering module is responsible for receiving messages sent to the client by the backup server and determining, according to the callbacks registered by the backup application, whether the messages are status notifications that should be passed to the backup application or ignored. Further discussion is provided below.

An example of a client-side library includes Data Domain Boost (DD Boost). An example of a backup storage server or backup appliance includes Data Domain (DD) or Data Domain Restorer (DDR). DD Boost and DD (or DDR) are products provided by Dell Technologies of Round Rock, Texas. In an embodiment, the clients access the file system hosted by the backup server using a protocol referred to as DD Boost. Thus, the clients may be referred to as DD Boost clients. DD Boost is a system that distributes parts of a deduplication process to the application clients, enabling client-side deduplication for faster, more efficient backup and recovery. In an embodiment, the clients use the DD Boost backup protocol to conduct backups of client data to the storage system, restore the backups from the storage system to the clients, request file-copy operations, or perform other data protection or file system operations.

The DD Boost library exposes application programming interfaces (APIs) to integrate with a Data Domain system using an optimized transport mechanism. These API interfaces exported by the DD Boost library provide mechanisms to access or manipulate the functionality of a Data Domain file system. Embodiments may utilize the DD Boost File System Plug-In (BoostFS), which resides on the application system and presents a standard file system mount point to the application. With direct access to a BoostFS mount point, the application can leverage the storage and network efficiencies of the DD Boost protocol for backup and recovery. A client may run any number of different types of protocols as the file system supports multiple network protocols for accessing remote centrally stored data (e.g., Network File System (NFS), Common Internet File System (CIFS), Server Message Block (SMB), and others). Some embodiments are described in conjunction with the DD Boost protocol, Data Domain Restorer (DDR) storage system, and Data Domain file system as provided by Dell Technologies. It should be appreciated, however, that principles and aspects discussed can be applied to other file systems, file system protocols, and backup storage systems.

In an embodiment, the data protection system includes functionality that allows a client user via the backup or other client application to manage the files that have been backed up to the different storage systems. This includes, for example, copying one or more files from one backup storage system to another backup storage system or to another location within the same storage system (e.g., within a same local instance of the file system). The flexibility afforded by having multiple copies of the data can improve the reliability of disaster recovery (DR) and help satisfy stringent recovery time objectives (RTO) that may be imposed by the enterprise organization.

More particularly, in an embodiment, there are multiple file-copy operations that applications can initiate via the client-side library (e.g., DD Boost client) APIs. In an embodiment, these file-copy operations may be referred to as optimized file operations because unlike traditional file copying that may be offered by protocols such as NFS these file-copy operations involve a deduplicated file system in which references and pointers are managed instead of or in addition to the actual content data of a file. More particularly, in a specific embodiment, the file-copy operations supported by the client-side library include a file-copy from a backup server to a remote or different backup server (e.g., different DDR) 145, a file-copy to another file or location on the same system 150 (e.g., copying from a first directory of an instance of a file system to a second directory within the instance of the file system), a file-copy from the backup server to the cloud 155, and a file-copy from the cloud to the backup server 160. A file-copy to a remote backup server may be referred to as Managed File Replication (MFR). For example, a backup administrator may wish to conduct replications of weekly full backups to a different or remote site for DR protection, while daily incremental backups remain on a local backup server for case of recovery. A file-copy to another file or location on the same system may be referred to as a fastcopy or file cloning.

A file-copy operation may include many thousands or even millions of files. These operations may take a significant amount of time to process depending on the amount of data being transferred (e.g., file sizes), network speed, model of the target system, number of files being transferred, and other factors. Applications need to invoke different client-side library (e.g., DD Boost) APIs to start and stop each of these file operations.

It is desirable to provide status or progress to the client backup application concerning the requested file-copy operation. One technique to provide status includes the backup application calling the client-side library (e.g., DD Boost) APIs to query the status of these per file transfers. It is noted that when traditional file transfer operations are used (e.g., standard copy using NFS protocol) the size of the target file can be queried to determine progress. When using an optimized transfer method in many cases (e.g., DD Boost backup, DD Managed File Replication) the size of the file will remain zero until the transfer is complete. For example, during a copying of data from a first file into a second file, a size of the second file remains zero until all the data of the first file has been copied into the second file. In an embodiment, querying the status of these operations relies an optimized file transfer query operation (e.g., dd_filecopy_status)—also referred to as polling.

This polling mechanism, however, consumes resources on the backup client as well as the source and target backup (e.g., Data Domain) server. Applications may need to invoke API calls at dedicated intervals to monitor progress for thousands of such operations running in parallel. This takes up connection resources between the backup client (e.g., DD Boost client) and backup server (e.g., DDR) and dedicated threads to handle the status calls for all those operations. Another limitation of the polling mechanism is that applications cannot submit a large numbers of jobs, and allow the backend code to process them as resources (e.g., streams) are available, since the application would need insight into which were started to know which ones to poll. In other words, there could be situations where the client application makes status requests for jobs that haven't even been started. This would not be a good use of resources.

There is a need for asynchronous file-copy operations. In an embodiment, a technique to make optimized file-copy operations truly asynchronous involves establishing a server-initiated communication channel 165 between a backup server (e.g., first backup server A) and client (e.g., first client A). Protocols such as NFS are synchronous with respect to file copying as threads are blocked during the copy operation. The backup server (e.g., DDR) can notify the client-side backup library (e.g., DD Boost) on the progress or completion status 166 of the above-mentioned file-copy operations once those operations are finished or have progressed to a specific point via the server-initiated communication channel. The progress or completion update call is initiated by the backup server (e.g., DDR) and travels back to the (DD Boost) client via the server-initiated communication mechanism. In other words, the progress or status notification is sent by the backup server without the backup server having been prompted, such as via polling, to provide an update.

Since the backup server or backup server file system (e.g., DDR or Data Domain File System (DDFS)), is the entity processing the optimized file-copy operations, it accurately knows the progress and completion of those jobs. The status is also sent back from the server to the client immediately after the completion of the job. It is instant as opposed to the inherent delay that can come with a polling mechanism which depends on polling interval.

Once the (DD Boost) client receives the server-initiated communication remote procedure call (RPC), it can then notify the application of these progress updates or completion status via a callback mechanism. It is noted that the application would have registered earlier for updates that it wants to receive. This approach enables the application to inform the end user of the status of operations in progress on the backup server (e.g., DDR). The backup application can update its relevant user interface (UI) on a regular basis. This technique of establishing a server-initiated communication channel to send status updates to the client eliminates the need for a polling mechanism to obtain the status of the operations.

This notification technique also allows the backup server to start jobs in batches and continue to notify the client as these jobs progress or complete. This technique eliminates the need to poll and also allows the backup application to submit a large number of jobs. The application does not need to continuously or repeatedly poll the client-side backup library for the status of each job as it progresses or until it completes.

The clients may include servers, desktop computers, laptops, tablets, smartphones, internet of things (IoT) devices, or combinations of these. The backup server receives requests from the clients, performs processing required to satisfy the requests, and forwards the results corresponding to the requests back to the requesting client system. The processing required to satisfy the request may be performed by the backup server or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage connected to the backup server includes, in addition to user data segments 151 making up files that have been backed up, other data structures storing metadata to facilitate access to the data via file system protocols, scaling of the file system, and deduplication. In particular, storage includes a namespace 152 and fingerprints 153, among other data structures 154. In an embodiment, the namespace is held in a tree structure and, more specifically, a Btree. The fingerprints correspond to unique hash values calculated from the data segments and may be stored in a fingerprint index. Further discussion is provided below.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Figure 2:
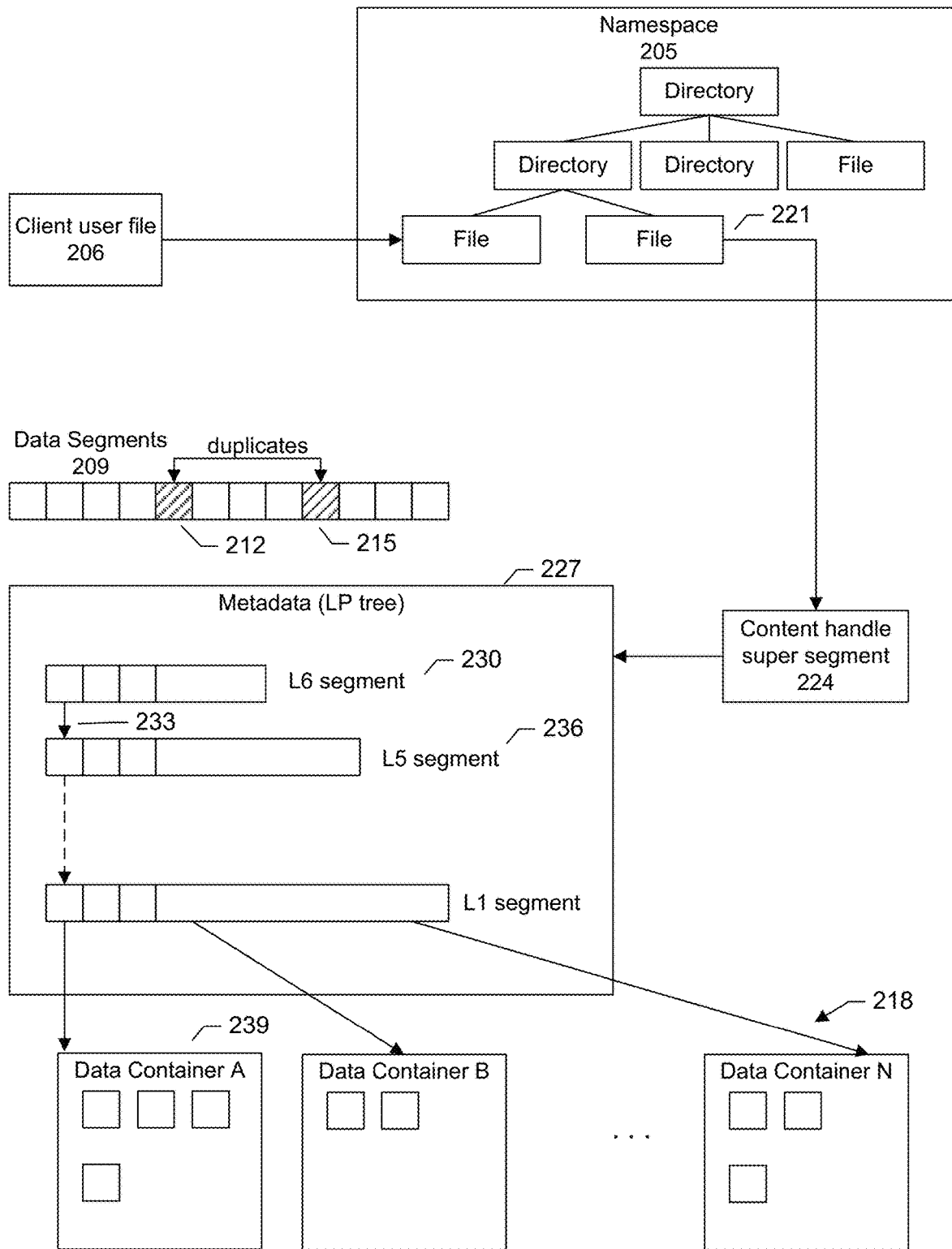
FIG. 2 shows an example of a deduplication process, according to one or more embodiments.

FIG. 2 shows a block diagram illustrating a deduplication process of the file system according to one or more embodiments. A deduplicated file system is a type of file system that can reduce the amount of redundant data that is stored. As shown in the example of FIG. 2, the file system maintains a namespace 205. In an embodiment, each node of a cluster is responsible for a particular portion of the namespace and each node may perform deduplication within its assigned portion of the namespace. Further details of a file system namespace are provided in FIG. 3 and the discussion accompanying FIG. 3.

As data, such as incoming client user file 206, enters the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within a shared storage pool. The amount of metadata may range from about 2 or 4 percent the size of the user data.

More specifically, the file system maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the fingerprint index. Matching fingerprints indicate that corresponding data segments are already stored. Non-matching fingerprints indicate that the corresponding data segments are unique and should be stored.

Unique data segments are stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the file system may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In other words, in an embodiment, every segment in the file system is identified by a 24 byte key (or the fingerprint of the segment), including the LP segments. Each LP segment contains references to lower level LP segments.

Figure 3:
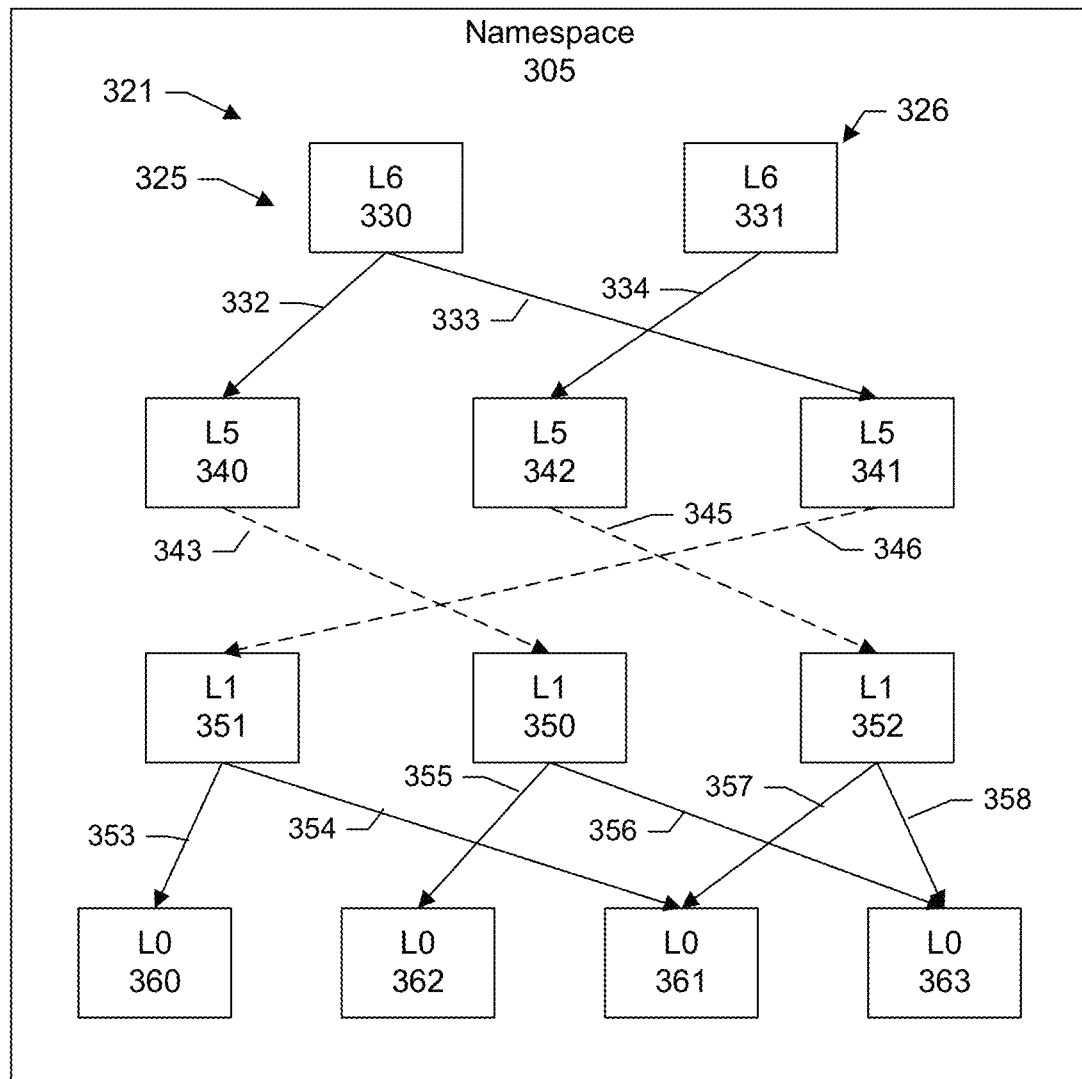
FIG. 3 shows an example of a namespace, according to one or more embodiments.

FIG. 3 shows further detail of a namespace 305 of the file system that may be used to organize the client data stored in the storage. The namespace includes a set of trees 321 where each file in the file system is represented by a tree. A tree includes a set of segment levels arranged in a hierarchy. In a specific embodiment, a tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first tree 325 having an L6 segment 330 and representing a first file. There is a second tree 326 having an L6 segment 331 and representing a second file.

Two or more files may share a same segment. A lower level segment may be referenced by one or more upper level segments. For example, a lower level segment may be referenced by a first upper level segment, and a second upper level segment. The first upper level segment may be from a first tree representing a first file. The second upper level segment may be from a second tree representing a second file. An upper level segment may reference one or more lower level segments. For example, an upper level segment may reference a first lower level segment and a second lower level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segments 351, segment 352 as shown by arrows 344, arrow 345 from L5 342 to L1 351, 352, respectively. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper level segment includes a fingerprint of fingerprints of one or more lower level segments referenced by the upper level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

Figure 4:
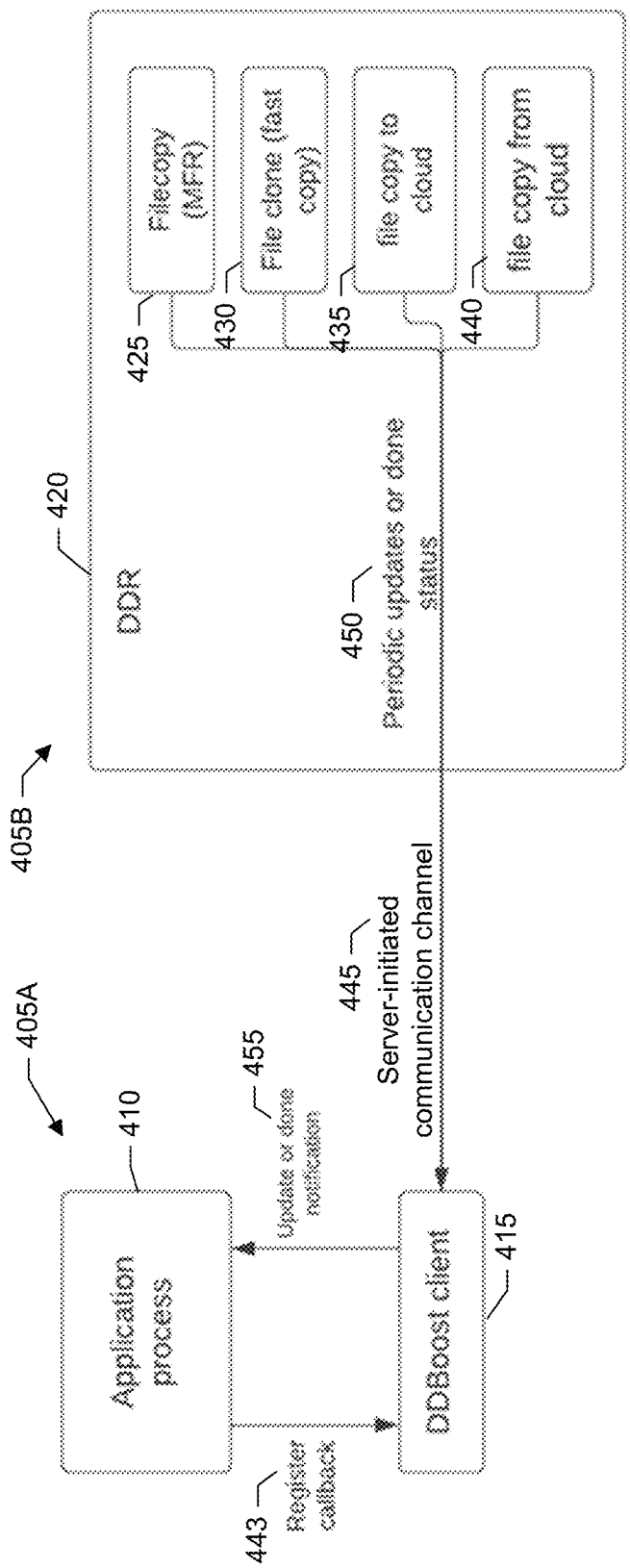
FIG. 4 shows a block diagram for status notifications of file-copy operations, according to one or more embodiments.

FIG. 4 shows a block diagram of providing status notifications of file-copy operations to clients. There is a client-side 405A and a server-side 405B. The client-side includes an application process 410 and client-side backup library 415 (e.g., DD Boost client library). The server-side includes a backup server (e.g., DDR) 420 having file-copy modules to handle the different types of file-copy operations that may be requested by the client including a file-copy from a backup server to a different or remote backup server (e.g., MFR) 425, file cloning (e.g., fastcopy) 430, file-copy from the backup server to cloud storage 435, and file-copy from the cloud to the backup server 440.

In an embodiment, a request from the backup application to the client-side backup library (e.g., DD Boost client) is accompanied with registering a callback 443 with the DD Boost client library. The DD Boost client processes the request and issues a remote procedure call (RPC) to the backup server (e.g., DDR) to fulfill the request. A server-initiated communication channel 445 is established between the DDR and DD Boost client. Each of the file-copy modules include logic to send periodic updates or completion status updates 450 from the DDR to the DD Boost client via the server-initiated communication channel. The DD Boost client processes the update and, if relevant, forwards the update 455 to the application process.

More particularly, in an embodiment, the DD Boost client establishes a server-initiated communication channel connection during an initial connection sequence with DDR. DD Boost client also sends out a client identifier so that clients can be uniquely identified on the server-side. Backup applications at the clients can start the file-copy operations such as fastcopy or MFR by calling DD Boost client APIs. The DD Boost client then sends or issues an RPC to DDR for the file-copy operations. Upon receiving these requested operations, the file-copy module responsible for handling the requested file copy-operations starts the processing of the jobs.

At this point, the DD Boost backup server will remember or track the client identifier, job identifier, username, and file identifier information in memory and persist the file-copy jobs that it had started. The DD Boost server also generates a unique key for each file-copy operation that it is asking the file system to act upon. The server maintains a mapping between the unique key that it is passing to the file system and the job information that it is storing in persistent memory. The unique key can be used to uniquely identify a job or file-copy operation. Each job managed by the backup server (e.g., DD Boost backup server) is associated with an identifier so that any number of different jobs from the same (or different) backup client can be tracked. A job may specify a particular file-copy operation to be performed on one or more particular files.

The DD Boost client is notified about progress, as requested, while the server is processing the job and when it is completed. Components processing the optimized transfer can post messages through the server-initiated communication channel queue along with the unique identifier that was passed by the DD Boost server and any additional information about the job status. A server-initiated communication channel message processor on the server-side will send out a message to the DD Boost client as an RPC message as shown in the file-copy response structure and RPC response structure of tables A and B below. The same mechanism is used to notify the calling entity about the completion of the operation as well.

On receiving a server-initiated communication channel RPC messages, the DD Boost client filters out messages based on the file-copy operations and then the DD Boost client will immediately notify an application by calling their callback function. The notification is per job and hence per file-copy operation that was started. The notification is identified by a handle that was passed earlier during a start of the operation. The notification is also instant or immediate and thereby allows the application to start another file-copy jobs instantly.

Since notification requires a channel via which it can be received from the backup server and sent to the application, the DD Boost client seeks to ensure that it has at least one connection open while there are pending jobs waiting for notification via reference counting.

This entire notification mechanism can continue to work along with a polling mechanism if the backup application chooses to do polling.

Tables A and B below show data structure examples of RPC server-initiated communication channel responses. Specifically, table A shows an example of different notification events supported by the server-initiated communication connection.

TABLE A

```
/* Different events to be notified supported by server-initiated
communication connection */
enum event_opcode {
   EVENT_NULL = -1,
   EVENT_FILE_UPDATE = 1,
   EVENT_QOS_UPDATE =2,
   ...
   EVENT_CLUSTER_UPDATE = 31
};
/* Server-initiated communication response structure
* rpc_version - version of rpc
* server-initiated_communication_event_id - msg id from server-
initiated communication
* opcode - opcode of event to be notified
* event_data - data of the notification
*/
struct server-initiated_communication_response {
   dd_uint32_t rpc_version;
   dd_uint32_t server-initiated_communication_event_id;
   server-initiated_communication_event_opcode opcode;
   server-initiated_communication_response *event_data;
};
```

Table B shows an example of different file-copy operation opcodes associated with notifications.

TABLE B

```
/* Different file-copy operation opcodes to be notified */
enum filecopy_update_opcode {
   FILECOPY_UPDATE_NULL = -1;
   FILECOPY_UPDATE_FASTCOPY = 1;
   FILECOPY_UPDATE_MFR = 2;
   FILECOPY_UPDATE_CLOUD_MOVE = 3;
   ...
};
```

TABLE B-continued

```
/* filecopy_update_response
 * event_opcode - event notification update
 * file_update_opcode - file update opcode
 * error_code - error code if any
 * bytes copied - number of bytes copied
 */
struct filecopy_update_response {
    event_opcode opcode;
    filecopy_update_opcode filecopy_opcode;
    dd_uint32_t error_code;
    dd_uint64_t bytes_copied;
    union {file_copy_operation_info};
};
```

Figure 5:
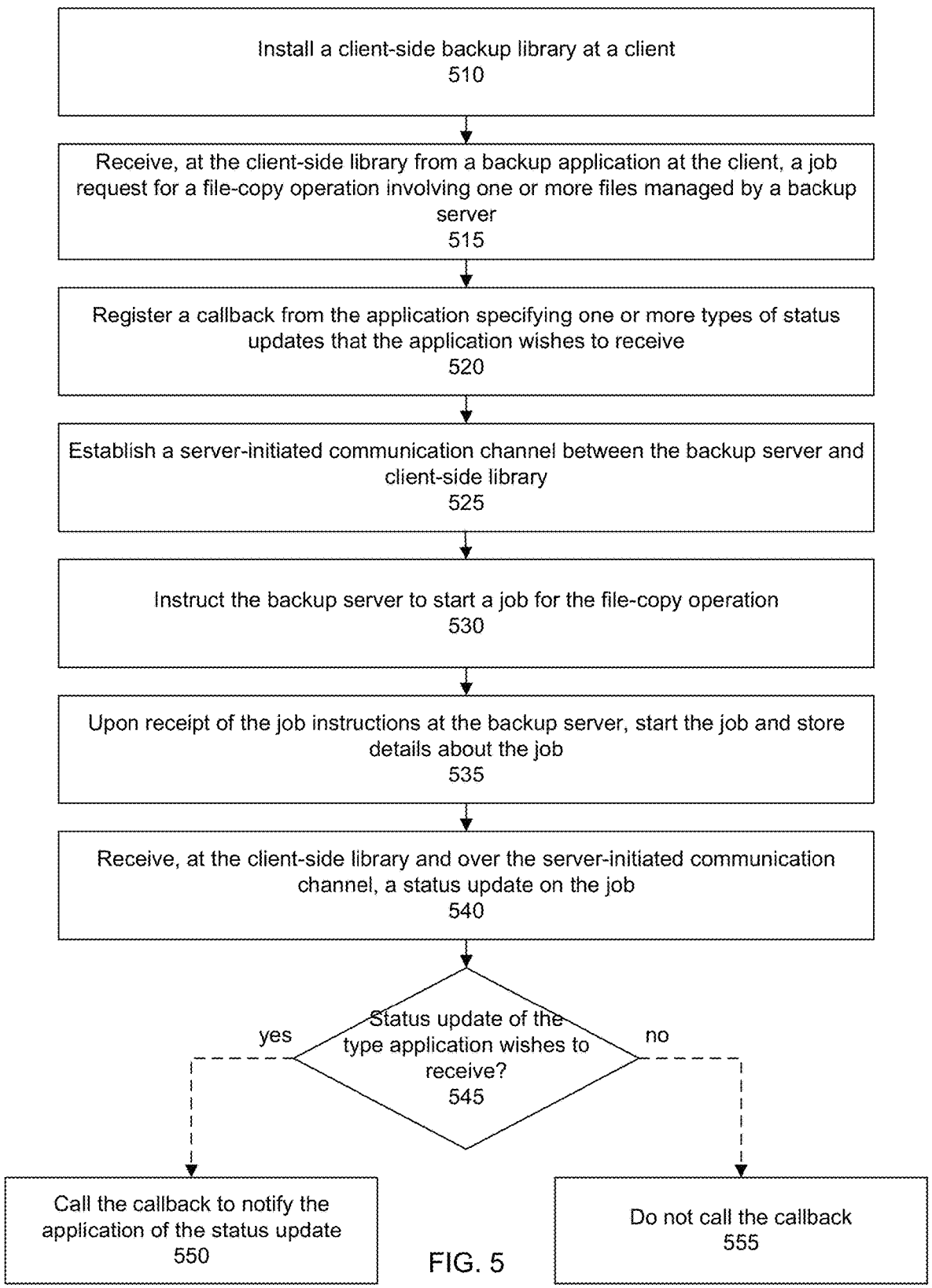
FIG. 5 shows an overall flow for sending status update notifications of file-copy operations, according to one or more embodiments.

FIG. 5 shows an overall flow for providing status notifications to clients of file-copy operations. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a client-side backup or deduplication library is installed at a client. In a step 515, the client-backup library receives, from a backup application at the client, a job request for a file-copy operation involving one or more files (or a directory containing files) managed by a backup server.

For example, the job may be to copy a set of (deduplicated) files from the backup server to another remote backup server, copy the set of files to a different location on the same backup server, copy the set of files to a cloud storage service, or copy a set of files from a cloud storage service to the backup server.

In a step 520, the client-side backup library registers a callback from the backup application specifying one or more types of status updates that the application wishes to receive for the file-copy operation job request. A callback is a piece of executable code that is passed as an argument to other code, which is expected to call back (execute) the argument. The execution may be immediate as in a synchronous callback. Alternatively, the execution may be at a later time as in an asynchronous callback. In other words, a callback is a function that is passed into another function as an argument and whose execution is determined by the parent function.

In an embodiment, as part of the callback registration process, the backup application specifies its desired status notification options or configuration to the client-side backup library. Such notification options may be time-based, size-based (e.g., byte-based), or both. For example, the backup application may specify that it wishes to receive status updates on the progress of the file-copy operation job every 60 seconds, receive status updates after each 1 megabyte (MB) of data transfer, or receive status update only upon completion of the entire file-copy operation job (or failure). The backup application may specify that it wishes to receive status updates at certain completion intervals. For example, the backup application may indicate that it wishes to receive a notification after each 10 percent of the total amount of data to transfer has been completed. Consider, as an example, that a total size of files to be transferred in the file-copy operation is 1 gigabyte (GB). In this scenario, the client-side backup library sends notifications to the backup application after every 100 MB of data has been transferred (e.g., 10 percent of 1 GB equals 100 MB).

The client-side backup library receives configuration settings specified by the client backup application indicating the types of progress notifications it wishes to receive. The client backup application indicates at a start of the file-copy operation job the types of status notifications it wishes to receive. In other words, the client backup application, rather than repeatedly calling the client-side library to check on status during processing of the file-copy job, specifies the types of status updates it wishes to receive before the file-copy job starts. The application does not need to maintain a thread for polling throughout the file-copy job. The backup server does not need to devote resources to respond to queries for status.

The status notification options are on a per-job basis and are passed as an argument to the client-side backup library at a time of the file-copy operation job request. In an embodiment, a default notification is configured as notifying only upon completion. The client backup application can submit multiple file-copy operation jobs with each job having a different configuration for status notifications.

For example, the backup application may submit a first file-copy operation job for a first set of files and specify first configuration notification options (e.g., send status updates every 60 seconds). The backup application may submit a second file-copy operation job for a second set of files and specify second configuration notification options (e.g., send status updates after every 1 MB of data transfer has been completed), different from the first configuration notification options.

As another example, the backup application may submit multiple separate file-copy operations where each submitted file-copy operation specifies a particular file and a particular status notification option. In this case, the client-side backup library sends status notifications for each file. As another example, the backup application may submit a single file-copy operation for a set of files where the single file-copy operation specifies a particular status notification option. In this case, the set of files are considered as a group such that the client-side backup library sends the status notifications at a group level rather than at the individual file level. For example, the client-side backup library may send a single status update for the group of files rather than multiple status updates for each file of the set of files.

This feature provides the backup application with great flexibility in determining the type or frequency of status updates it wishes to receive. The backup application can relay or consolidate the status updates to the end user as it sees fit. For example, the backup application may use the status updates to display a progress bar on a graphical user interface (GUI) for a user at the client, display a listing of files that have been transferred, display a count of a number of bytes that have been transferred, and so forth.

In a step 525, a server-initiated communication channel is established between the backup server and the client-side backup library. Further discussion is provided below.

In a step 530, the client-side backup library issues an instruction or request to the backup server for the backup server to start the file-copy operation job.

In a step 535, the backup server, upon receipt of the job instructions starts the job and stores or persists details about the job. Such job details may include, for example, identifiers of the client, files, job, username of the client user, or combinations of these. Storing the job details allows for recovery from crashes.

In an embodiment, the jobs for various file-copy operations submitted by various clients are stored on the jobs list by the backup server. The jobs lists provides a holding queue that allows the clients to submit jobs in batches or any number of jobs (e.g., 100, 500, 1000, 2000, or more than 2000 jobs). For example, when the client backup application issues a request for a file-copy operation to the client-side backup library, the client-side backup library can immediately submit a job request for the file-copy operation to the backup server. Even if the backup server is busy processing other tasks, the jobs list allows for a receipt and buffering of the jobs so that there is no need for the client-side backup library (or backup application) to withhold submissions because the backup server is busy.

Further, resources that the backup application might consume due to having to maintain polling threads for each job that is submitted can now be devoted to other tasks. Thus, the client backup application, rather than having to limit the number of jobs submitted based on the number of polling threads for which resources are available, can submit any number of or many more jobs because there is no need to dedicate threads to repeatedly check on progress.

As the backup server processes the file-copy operation job, the backup server sends status updates to the client-side backup library over the server-initiated communication channel. The backup server may send the status updates according to a preconfigured or default setting. For example, the backup server may be configured to send status updates every 30 seconds. Each status update may include one or more of an amount of data that has been transferred (e.g., number of bytes transferred), amount of data remaining to be transferred, number of files transferred, number of files remaining to be transferred, estimated time remaining to complete the file-copy operation, or combinations of these.

In a step 540, the client-side backup library receives, over the server-initiated communication channel, the status update on the file-copy operation job from the backup server.

In a step 545, the client-side backup library determines whether the update is of the type that the backup application wishes to receive. For example, as discussed above, the callback registration process allows the application to specify the type or frequency of status update it wishes to receive. The client-side backup library reviews the status notification options specified by the application during the callback registration process to determine whether the status update received from the backup server should be sent, forwarded, or provided to the application.

In a step 550, if the client-side backup library determines that the status update is of a type that the backup application has indicated it wishes to receive, the client-side backup library calls the callback to notify the backup application of the status update.

Alternatively, in a step 555, if the client-side backup library determines that the status update is not of a type that the backup application has indicated it wishes to receive, the client-side backup library does not or refrains from calling the callback. In other words, the client-side backup library performs a filtering to determine whether or not the status update should be passed to the backup application.

For example, the backup server may be preconfigured (such as via a vendor of the backup server) to send status updates every 60 seconds. The backup application, however, may have indicated during the callback registration process that it wishes to receive a status update only upon completion of the job. In this scenario, the client-side backup library filters the intermediate status updates received from the backup server and calls the callback function of the backup application only upon receiving the status update indicating completion of the job (or error).

In an embodiment, a method includes: receiving, from a backup application, an application programming interface (API) call comprising a job request for a file-copy operation on one or more files managed by a backup server; forwarding the job request to the backup server; while the job is being processed by the backup server, not receiving, from the backup application, an API call requesting the status update; receiving, from the backup server, a status update on a progress of the job; and sending the status update to the backup application.

Figure 6:
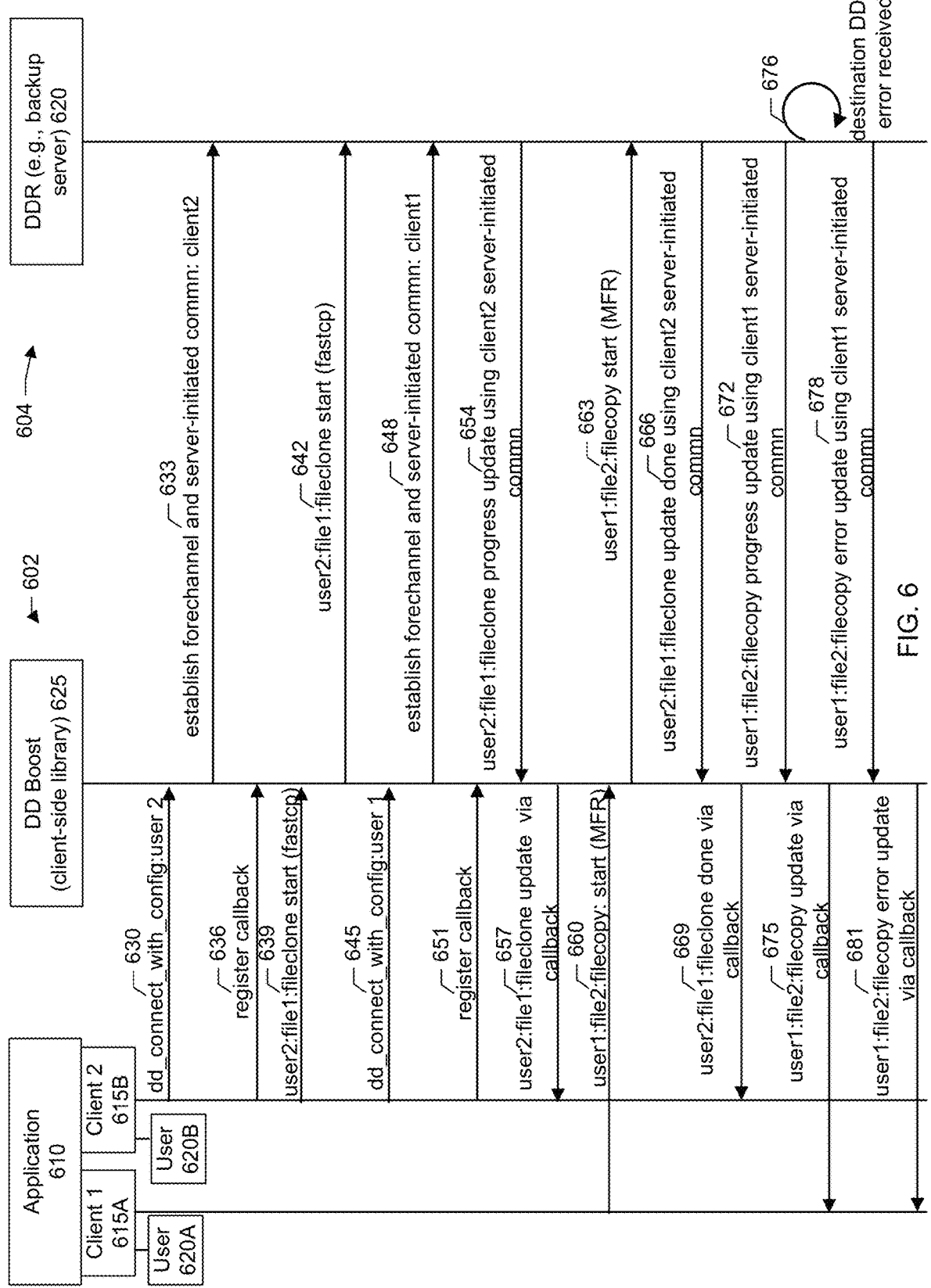
FIG. 6 shows a sequence diagram for the status notifications, according to one or more embodiments.

FIG. 6 shows a sequence diagram of a flow for processing file-copy operations. There is a client-side 602 and a server-side 604. The client-side entities include a client backup application 610 for each of first and second clients 615A,B at which there are first and second users 620A,B, respectively, and a client-side backup library (e.g., DD Boost) 625 that may be installed at each client computer. The server-side entity includes a backup server (e.g., DDR) 620.

In a step 630, a connection is made from the client application to the client-side backup library by the second user at the second client using a command, e.g., "dd_connect_with_config:User2." The connection to the client-side library includes providing the client-side backup library with a username and password for authentication. Upon authentication, in a step 633, both a forechannel connection and a server-initiated communication channel is established between the backup server and client-side backup library for the second client.

In a step 636, a first callback from the second client is registered at the client-side backup library. As discussed, the callback specifies the types of status updates that the application wishes to receive.

In a step 639, the second user at the second client issues a request for a file-copy operation involving a first file. In this example, the requested file-copy operation is to clone the first file (e.g., copy the first file from a first directory on the backup server to a second directory on the backup server). As discussed, such an operation may be referred to as a fastcopy. In particular, the second user at the second client causes a call to be made to the client-side library to start the fastcopy of the first file.

In a step 642, the client-side backup library, upon receipt of the start command for the fastcopy, issues a corresponding request to the backup server to start the file-copy operation (e.g., fastcopy) of the first file for the second user.

While the fastcopy operation is in progress, in a step 645, another connection is made from the client application to the client-side backup library by the first user at the first client using a command, e.g., "dd_connect_with_config:User1." In a step 648, both a forechannel connection and a server-initiated communication channel is established between the backup server and client-side backup library for the first client.

In a step 651, a second callback from the first client is registered at the client-side backup library.

In a step 654, a status update on a progress of the fastcopy operation involving the first file is sent from the backup server to the client-side backup library using the server-initiated communication channel established with the second client. For example, the status update may indicate that the operation is 50 percent complete.

In a step 657, the client-side backup library updates the application on the fastcopy operation by calling the callback.

In a step 660, the first user at the first client issues a request for a file-copy operation involving a second file. In this example, the requested file-copy operation is to replicate a second file on the backup server to a different backup server. The backup server may be referred to as a source server and the different backup server may be referred to as a destination server. As discussed, such an operation may be referred to as managed file replication (MFR). In particular, the first user at the first client causes a call to be made to the client-side library to start the MFR of the second file.

In a step 663, the client-side backup library, upon receipt of the start command for the MFR, issues a corresponding request to the backup server to start the file-copy operation (e.g., MFR) of the second file for the first user.

In a step 666, a status update on a progress of the fastcopy operation involving the first file is sent from the backup server to the client-side backup library using the server-initiated communication channel established with the second client. The status update indicates that the fastcopy operation has completed.

In a step 669, the client-side backup library updates the application on the fastcopy operation by calling the callback.

In a step 672, a status update on a progress of the MFR operation involving the second file is sent from the backup server to the client-side backup library using the server-initiated communication channel established with the first client. For example, the status update may indicate that the operation is 50 percent complete.

In a step 675, the client-side backup library updates the application on the MFR operation by calling the callback.

In a step 676, an error is encountered with the MFR operation. For example, the destination backup server may have become unavailable due to a network disruption between the destination backup server and (source) backup server 620, hardware crash, software bug, or other problem.

In a step 678, the backup server (e.g., source backup server) propagates the error message associated with the MFR operation on the second file back to the client-side library using the server-initiated communication channel established with the first client.

In a step 681, the client-side backup library updates the application on the problem with the MFR operation by calling the callback.

Figure 7:
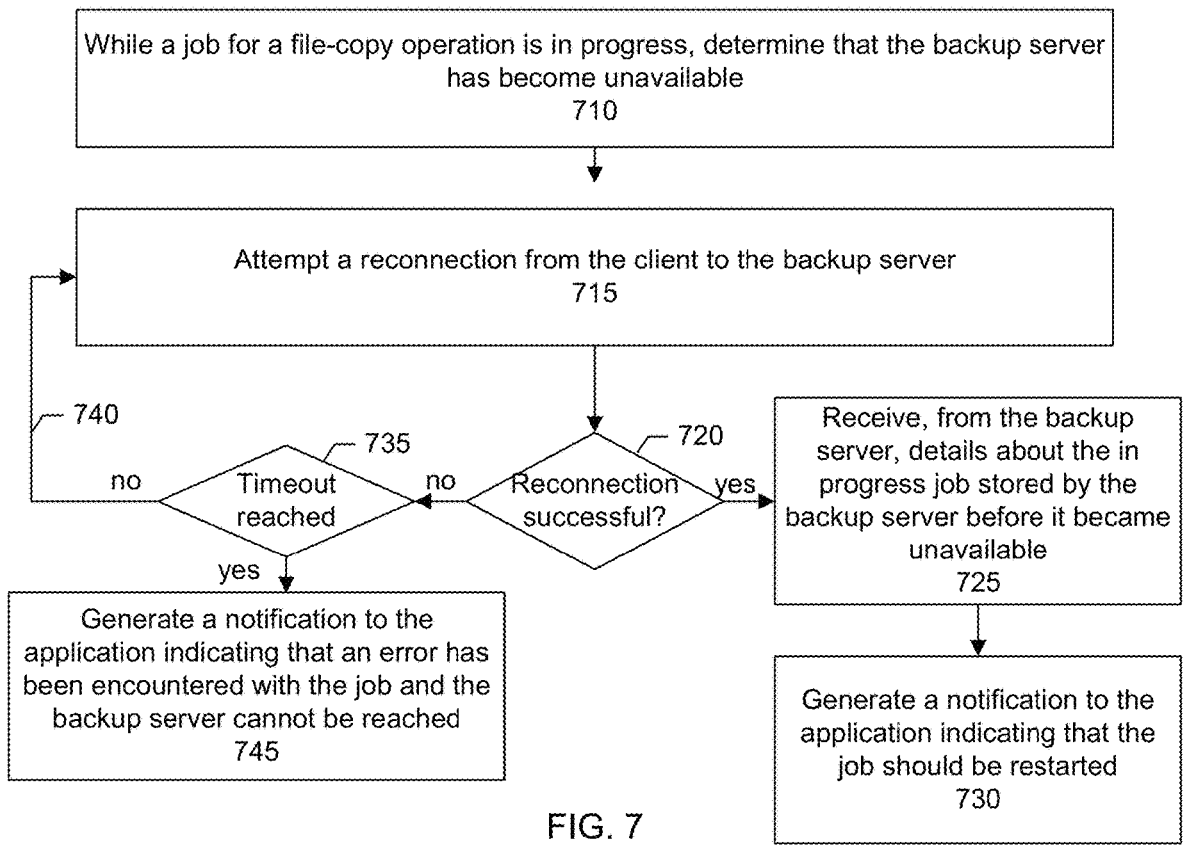
FIG. 7 shows a flow for crash handling, according to one or more embodiments.

FIG. 7 shows a flow for handling crashes. A crash may be the result of a software bug, network issue, hardware issue, or other problem that causes a service to become unavailable. In the events of a file system crash or other connection errors, the client-side libraries at the clients (e.g., DDBoost clients) can detect those errors based on underlying disconnect events. Upon reconnecting to server, if the reconnect is successful, the backup server (e.g., DD Boost server) reviews details about the stored pending or in-progress jobs and sends out messages via the server-initiated communication channel for all the handles that it had stored prior to the crash and reloaded from persistent memory after the crash. The client-side library (e.g., DD Boost client) upon receipt of the handles identifying the files associated with the file-copy operation then notifies the backup application with the appropriate error code to suggest that the application to restart the file-copy operations.

Alternatively, if the reconnection to the backup server was not successful and timed out, the client-side backup library (e.g., DD Boost client) notifies the backup application about the system error. The backup application can make a later attempt to reconnect with the backup server and make a request for the status of the file-copy jobs.

Referring now to FIG. 7, in a step 710, while a job for a file-copy operation is in progress, a determination may be made by the client-side backup library that the backup server has become unavailable. For example, the determination may be made based on a lack of response from the backup server after a threshold time period has elapsed or a failure to receive a heartbeat signal from the backup server.

In a step 715, the client-side backup library attempts a reconnection to the backup server including reestablishing a server-initiated communication channel. In a step 720, a determination is made as to whether the reconnection was successful. If the reconnection was successful, in a step 725, the client-side backup library receives from the backup server details about the in progress job stored by the backup server when the backup server initially received the request and before the backup server became unavailable. In particular, the reconnection by the client is accompanied by an identifier associated with the client. The backup server can use the client identifier to scan and cross reference the client identifier against a table that maps in progress jobs and the corresponding client that submitted the job. In a step 730, the client-side backup library generates a notification to the backup application indicating that the job should be restarted.

Alternatively, if the reconnection to the backup server was not successful, the client-side backup library enters a loop to repeat the connection attempt. Specifically, a determination is made as to whether a timeout has been reached (step 735). If the timeout has not been reached, the process loops back 740 to make another attempt at reconnecting to the backup server (step 715).

If, however, the timeout has been reached, in a step 745, the client-side backup library generates a notification to the backup application indicating that an error has been encountered with the job and that the backup server cannot be reached.

Consider, as an example, a file system crash of the backup server while a set of jobs for a client are in progress. As discussed, details about the jobs will have previously been stored by the backup server in persistent memory at a start of the jobs. When the file system is brought back online, the backup server can load the job details from persistent memory. When the client-side backup library reestablishes a connection to the backup server, including a server-initiated communication channel with the backup server, the backup server can send to the client-side backup library via the server-initiated communication channel messages identifying the in progress jobs that were affected by the crash, an error code, and an indication that the jobs should be resubmitted or restarted. The client-side library, in turn, calls the callback function of the client backup application to inform the application of the error. The application (or user) can then decide whether to restart or resubmit another file-copy operation request.

Errors encountered at the backup server can be propagated immediately to the client-side backup library and without prompting unlike polling. This facilitates quicker recoveries and restarts of failed file-copy operations because there are no delays as may be the case when polling is used. Specifically, with polling, the client-side backup library and ultimately client backup application may discover the error only after a polling interval has elapsed. This can thus lead to a delay in restarting failed file-copy operations.

Figure 8:
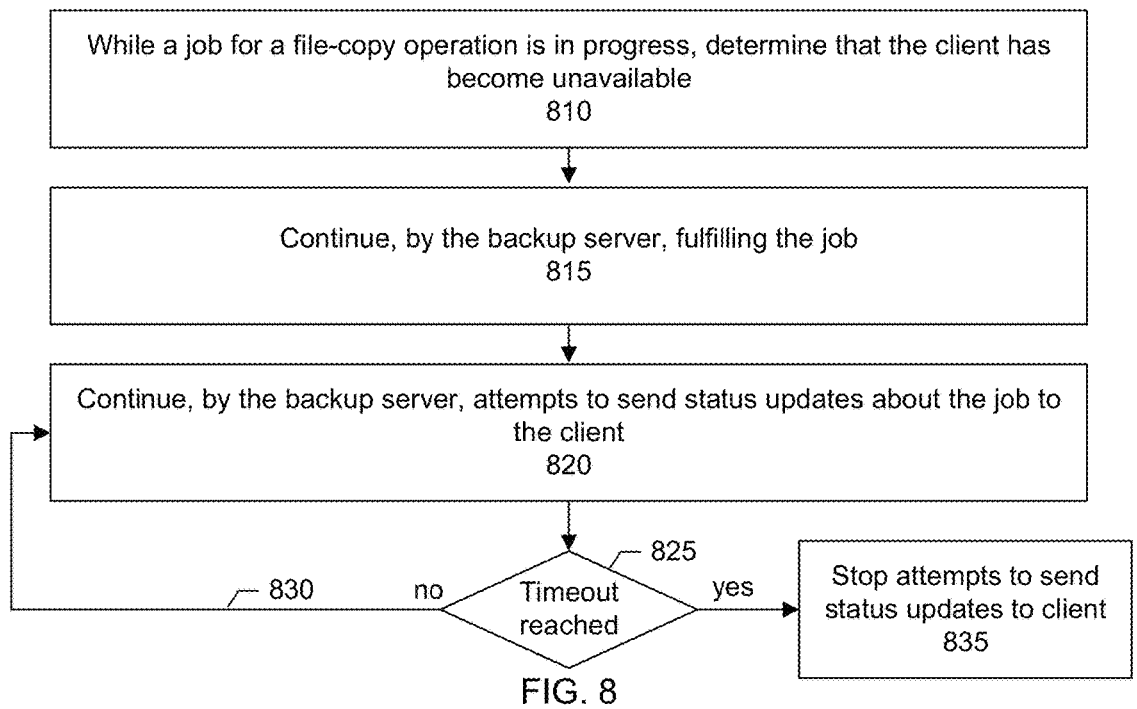
FIG. 8 shows another flow for crash handling, according to one or more embodiments.

FIG. 8 shows another flow for handling crashes. In the event of a crash associated with the client-side backup library (e.g., DD Boost client crash), the library upon restart reestablishes a server-initiated communication channel with the backup server (e.g., DD Boost server). The backup server (e.g., DD Boost server) does not have a dependency on the client-side state. The client-side backup library does not need to maintain state. Instead, the backup server continues with its processing of the file-copy operation jobs that were submitted by the client and will still notify the client about all the jobs that were completed once the client is brought back online. The backup server may continue with retrying the notifications until it is able to send a server-initiated message or a certain timeout occurs. The backup application in the event of crash can also choose to send a STOP operation to the client-side library which then submits the STOP operation request to the backup server. The backup server, upon receipt of the STOP command, will simply discard that job.

More particularly, in a step 810, while a job for a file-copy operation is in progress, a determination is made that the client (e.g., client-side backup library) has become unavailable. For example, a timeout may have occurred during which no heartbeat signals were received from the client by the backup server. In a step 815, the backup server, however, continues processing and fulfilling the job. In a step 820, the backup server continues making attempts to send status updates about a progress of the job to the client-side backup library. In a step 825, a determination is made as to whether a timeout has been reached. If the timeout has not been reached, the process loops back 830 to continuing attempts to send the status updates to the client. Alternatively, if the timeout has been reached, in a step 835, the backup server stops or ceases attempts to send the status updates.

In various embodiments, systems and techniques allow for immediate notification of success or failure of an optimized per-file transfer; allow applications initiating optimized file transfers to scale, since these can be submitted in bulk, without needing to poll for the status of each; reduces the risk of file unavailability at the disaster-recovery site by reducing the window of time when a file transfer is not successful and when the administrator or client application is able to resolve the issue and restart the transfer; and allow for receiving a single notification for a set of files, for e.g., a complete directory or a list of files.

Figure 9:
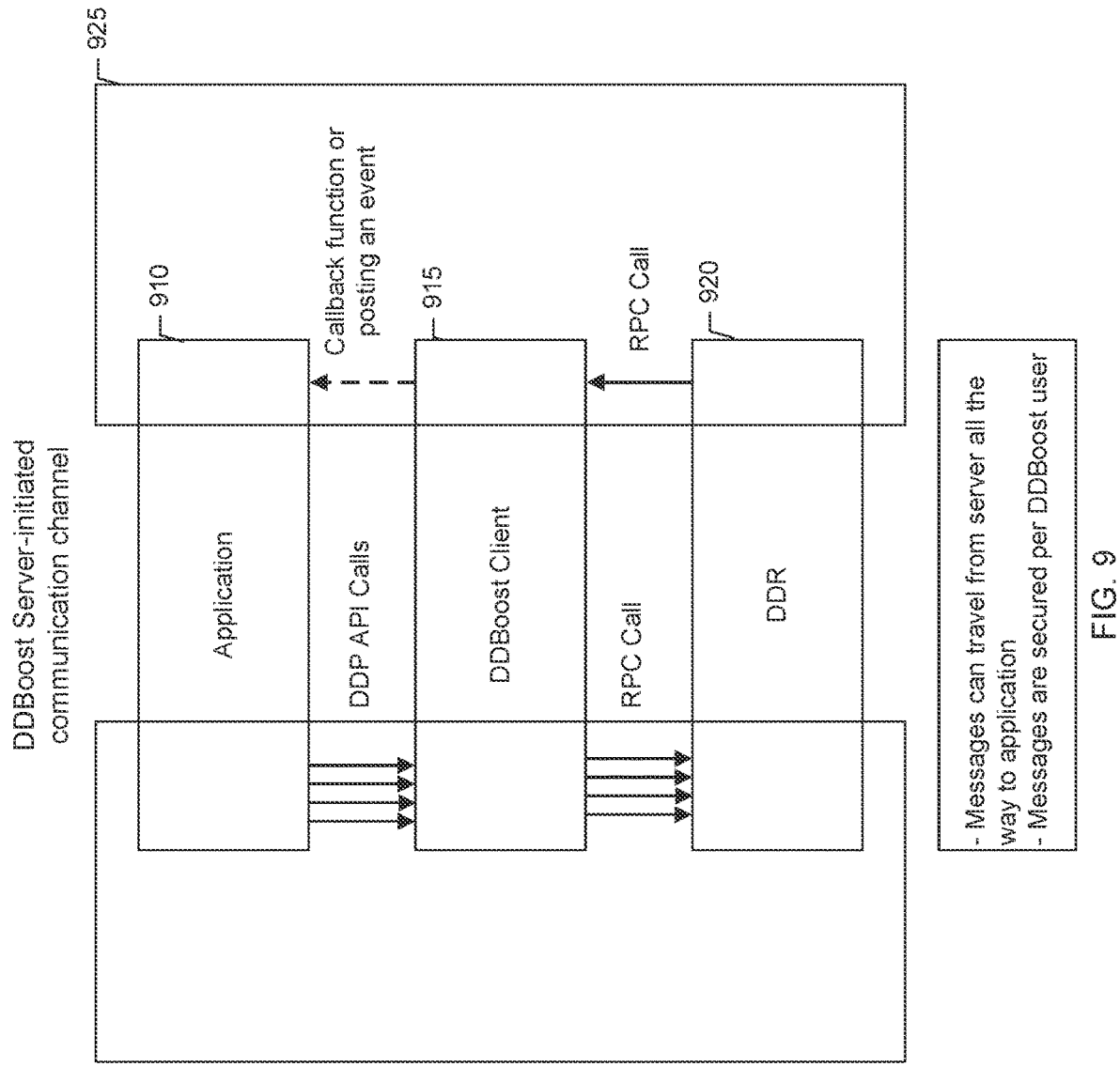
FIG. 9 shows a block diagram of a server-initiated communication connection, according to one or more embodiments.

FIG. 9 shows a block diagram of a DD Boost server-initiated communication channel workflow. The example shown in FIG. 9 includes an application 910 (e.g., client backup application), DD Boost client 915 (e.g., client-side library), and DDR server 920. In an embodiment, systems and techniques are provided for secure end-to-end notification of DD Boost server-side events. A typical workflow from a backup application to DDR via a DD Boost client is as follows. An application calls an API referred to as DD API into the DD Boost client and the DD Boost client sends one or more RPCs to DDRs.

In an embodiment, systems and techniques are provided for a protocol that allows server-side events to be sent back to the client and application. In an embodiment, the connection protocol is referred to as a server-initiated communication channel 925. The server-initiated channel is used for cases where callback requests from DDR to DD Boost clients are required. Messages can travel from the server (e.g., DDR) to the DD Boost client to the application. The messages are secured for each DD Boost user.

In various embodiments, systems and techniques are provided for end-to-end and secured events messaging for client, authenticated user or storage unit specific events; mechanisms allowing file system level subsystems to use the server-initiated channel to deliver events; delivering messages back to either one client or multiple clients or all the clients; processing dead (or hung up) messages; and for switching between an existing connection to receive a server-initiated communication message on the client (without needing to have sessions).

Figure 10:
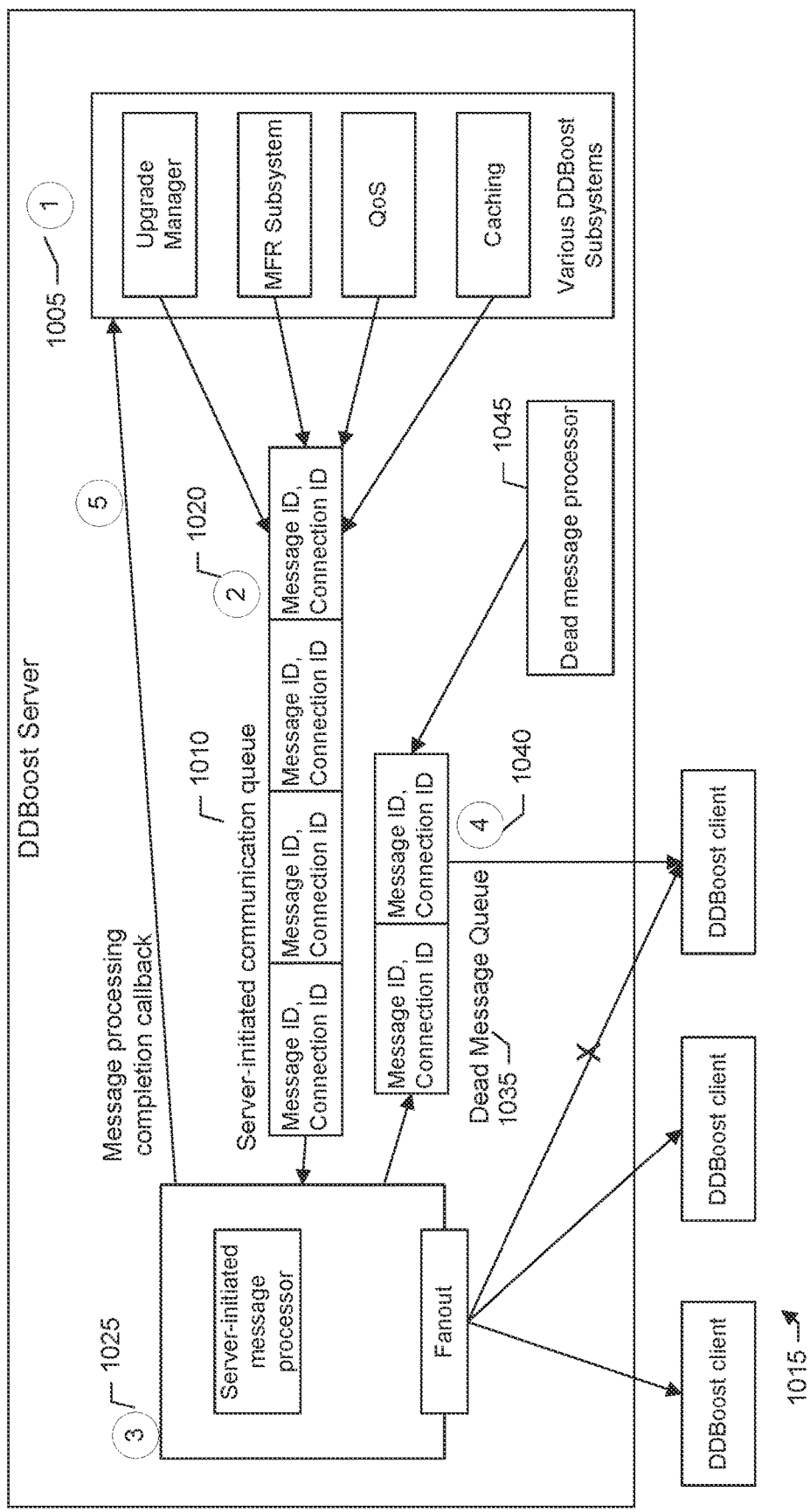
FIG. 10 shows a block diagram of a server-initiated communication connection at a server-side, according to one or more embodiments.

FIG. 10 shows a block diagram illustrating an overview of a DD Boost server-side implementation. In a first step 1005, various DD Boost/file system subsystems enqueue messages to a server-initiated message queue 1010 whenever they want to send out a message to a DD Boost client 1015 (e.g., client-side library or backup application). Some examples of events include MFR job completion, DD is undergoing upgrades, feature toggle change, QoS, and the like. A further listing of use cases are provided in a later discussion. The subsystem is able to register a callback that can be called back when the delivery of the message is successful. The subsystems are able to cancel the message at any point of time until the callback is not called. Cancelling of the message will only cancel the outstanding messages and not the ones which are being processed. Such subsystems can call an API to enqueue the message with the information such as message ID, message data, client identifier and callback function if required. Client identifier is specified in such a way to distinguish whether the message needs to be delivered to single client or multiple clients or all the clients.

In a second step 1020, the server-initiated message queue holds all the outstanding messages that need to be sent to the one client or multiple clients. In an embodiment, the queue is an ordered queue.

In a third step 1025, a server-initiated message processor 1030 retrieves messages from the server-initiated message queue and sends out messages to the DD Boost client. DD Boost server on DD maintains a pool of connections which are marked for server-initiated messages. In order to identify clients uniquely, the DD Boost client sends a unique ID per client instance to the DD Boost server. The server-initiated message processor iterates over the RPC connections and stores private data about the server-initiated message, UserID, StorageUnit, and the like at the RPC layer.

While sending RPC messages back to the client, the server-initiated message processor as shown in FIG. 10 calls the RPC layer helper function to find out all the current connections and filter out connections where an RPC message needs to be sent back based on the message and extra information stored per connection. It then invokes the RPC layer calls to send the message on the wire. If the message is undelivered, it is added to a dead message queue 1035.

In a fourth step 1040, the dead message queue is used for the retry mechanism. This ensures that primary messages are not logged because of unresponsive clients. A dead message processor 1045 works on the dead message queue to continue retry based on a configurable retry count and retry timeouts before abandoning sending out the message.

Table C below shows an example of an RPC server-initiated message.

TABLE C

```
// Server-initiated communication message that is submitted by
subsystem to DDBoost Server-initiated communication Message
Queue
typedef struct rpc_server-initiated_msg {
    int msg_type; //ALL_CLIENTS, SPECIFIC_CLIENT
    int stack_id; //connection identifier or 0xffffffff to
indicate all clients
    unique_id_t client_id; // client ID or 0xffffffff
    int msg_number; //RPC message number
    union { RPC message data};
};
// RPC message which will travel on the wire from DDBoost Server
to DDBoost client
typedef struct rpc_server-initiated_msg {
```

TABLE C-continued

```
    int msg_type;
    int msg_number; //RPC message number
    union { RPC message data};
};
```

Figure 11:
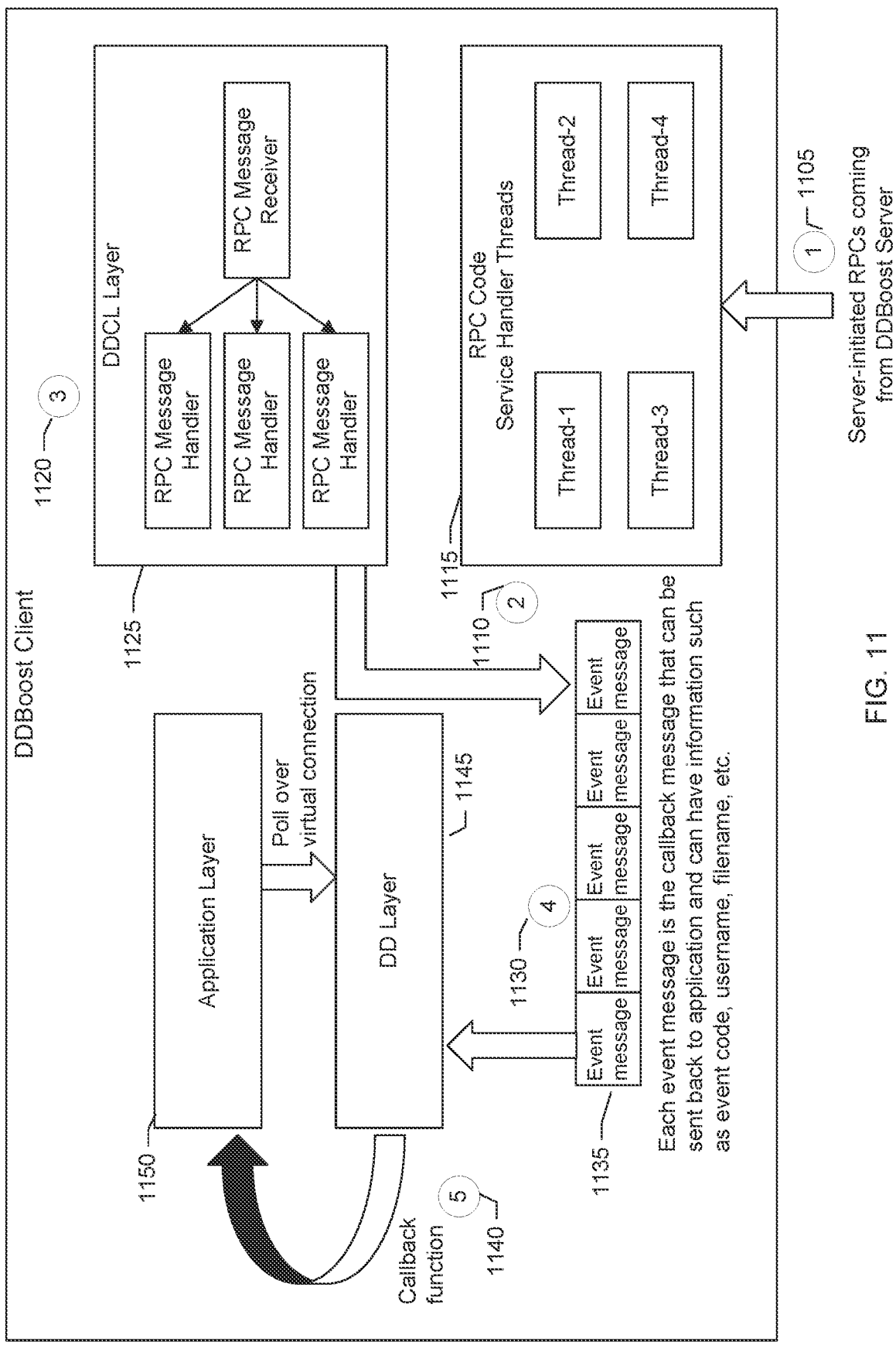
FIG. 11 shows a block diagram of a server-initiated communication connection at a client-side, according to one or more embodiments.

FIG. 11 shows a block diagram illustrating an overview of a DD Boost client-side implementation. In a first step 1105, server-initiated RPC messages are received by an RPC layer on the client-side.

In a second step 1110, DD Boost client-side RPC code receives server-initiated messages from the server. Service handler threads 1115 will start processing them. It is not expected to be receiving hundreds of messages at the same time. So, four or about four RPC threads will be enough to be allocated statically for server-initiated message processing.

In a third step 1120, DDCL layer message handlers 1125 conduct RPC message specific processing. These message handlers are defined per RPC message. And a subsequent processing required for a particular message is performed in the DDCL layer.

In a fourth step 1130, an event queue 1135 holds the events that need to be sent back to the backup applications. Once the DDCL layer message handler processes the server-initiated message, it can determine if this also needs to be notified to the backup applications (e.g., MFR job completion status). In such scenario, it posts a relevant message to the event queue. The DDCL layer also converts server-initiated message data into application specific data such as including connection and user identifier in the event.

In a fifth step 1140, a DD layer 1145 can implement a generic callback message that is called into an application space 1150. This notifies the application that there are events that the application can consume. An application can then poll for the events via a DD Boost API.

In an embodiment, server-initiated communication channel creation is driven via DD Boost clients. This is desirable as the DD Boost client does not need to listen on any port and such a requirement is not practically feasible as customers may not want to open any ports in their environment. This also allows driving server-initiated communication channel creation via a DD Boost API and for an application specific scenario. The DD Boost client can also decide when it wants to create server-initiated communication connection channel or wants to reuse some connection depending on the different application specific environment in which it is working.

The DD Boost client makes a physical TCP connection with the DD Boost server and dedicates that the connection to be used only for server-initiated messages via a technique as described below.

Since the server-initiated channel is per client and per DDR, the connection has to be established during the first physical connection from client to DD and should be closed during the last connection close from client to DD. However, when the connection is established, DD still does not know whether a channel is being used for regular RPCs or for server-initiated communication RPCs. Thus, a new RPC is introduced to indicate the same.

Table D below shows an example of an RPC to indicate establishment of a server-initiated communication channel.

TABLE D

```
#define USE_CONN_AS_SERVER-INITIATED 1
struct dd_conn_type_args_v1 {
    dd_uint32_t rpc_version;
    dd_connection_flag flag;
    string clientid< >; // can be IP address or some client
specific name
};
union dd_conn_type_args switch (dd_rpc_version rpc_version) {
    case DD_RPC_VERSION_1:
        dd_conn_type_args_v1 v1;
    default:
        void;
};
struct dd_conn_type_res_v1_ok {
    dd_uint32_t rpc_version;
};
struct dd_conn_type_res_fail {
    dd_err_t err;
    dd_uint32_t rpc_version;
};
union dd_conn_type_res_v1 switch(nfsstat3 status) {
    case NFS3_OK:
        dd_conn_type_res_v1_ok resok;
    default:
        dd_conn_type_res_fail resfail;
};
union dd_conn_type_res switch (dd_rpc_version rpc_version) {
    case DD_RPC_VERSION_1:
        dd_conn_type_res_v1 v1;
    default:
        void;
};
```

In an embodiment, the above RPC is sent during a connection sequence immediately after an authentication sequence completes. In other embodiments, the client can choose to send the new RPC any time. Once the DD Boost server receives this RPC, it allocates resources for the server-initiated communication channel. Once the resources are successfully allocated, the DD Boost server responds back to the client. DD Boost client should be ready to receive RPCs from the DD Boost server at this point. This also means that the DD Boost client should first allocate its own resources before sending the above RPC to DD Boost server.

The DD Boost server can also choose to return a failure should there be cases where insufficient resources are available or any other error scenarios.

Figure 12:
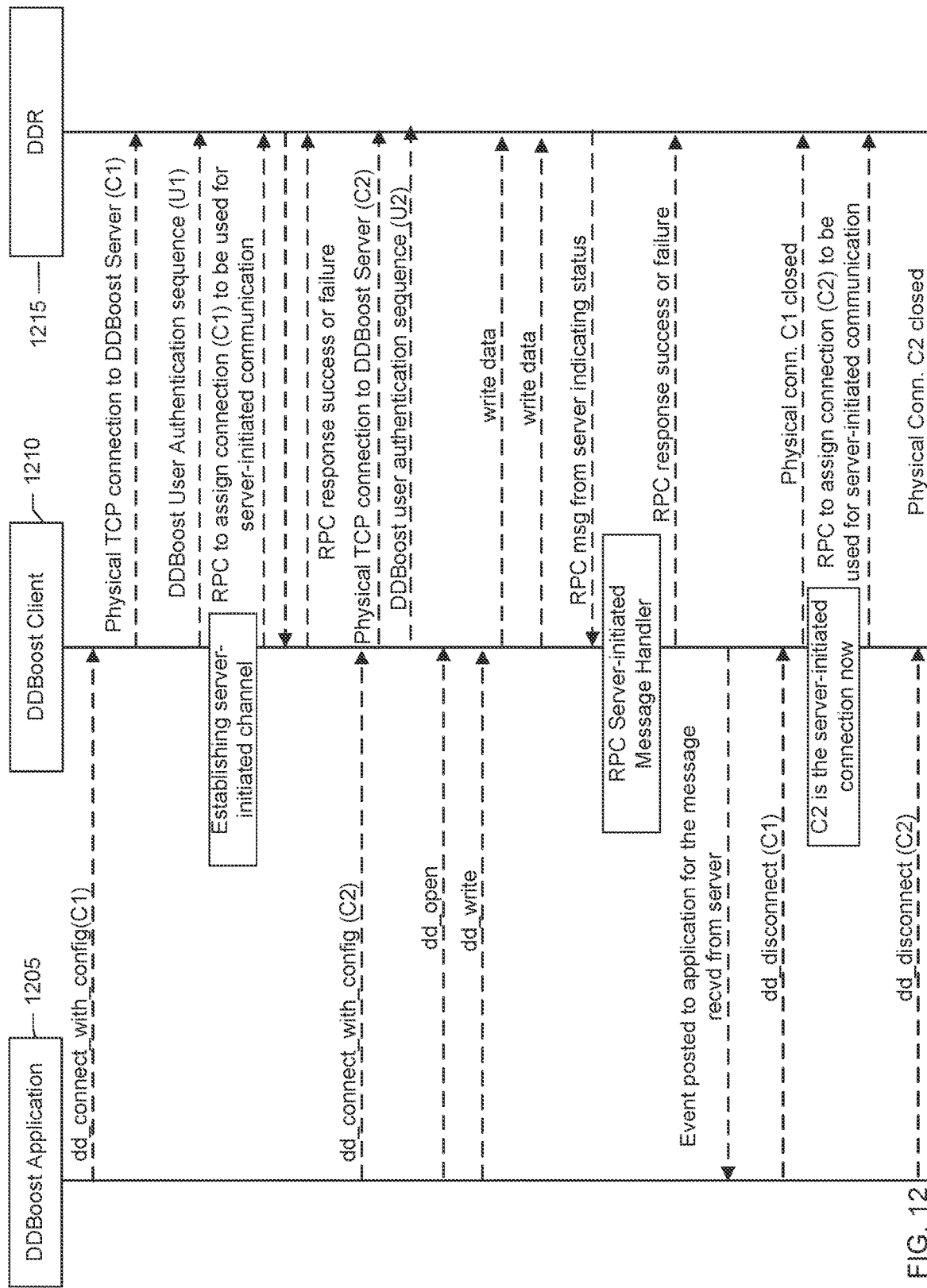
FIG. 12 shows a sequence diagram of a server-initiated communication connection, according to one or more embodiments.

FIG. 12 shows a sequence diagram for server-initiated communication channel connection and disconnection. The sequence of when a server-initiated communication connection is established and destroyed is shown in FIG. 12. The sequence diagram shown in FIG. 12 includes a DD Boost application 1205 (e.g., backup application), a DD Boost client 1210, and a DDR 1215. The DD Boost client manages which connection is used for a server-initiated communication channel connection with each DD Boost server it connects to. It may manage an array or pool of connections identifiers for all the connections to the DD Boost server. It adds an enum/flag to indicate the connection is also used for a server-initiated communication channel.

In case of a connection getting terminated and that connection was also marked for use as a server-initiated communication connection, it will review the established connection pool and find another connection that can now be used as a server-initiated communication connection as part of the termination sequence.

The DD Boost client sends a similar RPC message to indicate a new connection to be used for server-initiated communication channel messages. The DD Boost server does not need to perform any specific actions other than adding the same to the pool of connections it is managing and mark that connection where it should send the server-initiated communication channel messages. DD Boost client ensures that it always sends the same unique client ID for the connection sequence of the same client instance.

In an embodiment, systems and techniques provide for a server-initiated feature toggle. A feature toggle on the DD Boost server side allows for addressing any unforeseeable bug in a customer's environment. When such feature is toggled off, the DD Boost server can return an appropriate error for the RPC as described above.

In an embodiment, systems and techniques provide for multiple connections per client. In an embodiment, the DD Boost client makes multiple connections to the DD Boost server depending on the scenarios. The DD Boost client can use the above mechanism to also dedicate or assign multiple connections as a server-initiated connection. The DD Boost client can choose to make few connections shared for server-initiated communication channel events. This is decided based on the number of "different" users connecting to the server. This can also depend on encryption being used across various connections. The server-initiated communication connection inherits the properties of the original connection being made by an application.

In an embodiment, systems and techniques provide for an RPC transfer mechanism. There can be multiple approaches that can be implemented to send an RPC message from server to client as described in the following. In a first approach, the DD Boost server sends server-initiated message using an RPC or gRPC mechanism. The DD Boost server acts as a client to send out RPC message and the client includes service handlers defined to service the incoming RPC messages. The remaining processing is as shown in FIG. 11 and described in the discussion accompanying FIG. 11.

In a second approach, the client sends RPC messages on the server-side during initialization of connection and will not expect an immediate reply from the server. The server can respond to the messages and when it has a message/event to send back to the client. The client then processes the reply as an incoming message by examining the "data" embedded in there. Once the processing is complete, it posts the new RPC message back to the DD Boost server along with the result of previously posted message. Both client and server can also embed message ID to determine the status.

Below are some uses cases of a server-initiated communication channel and discussion of corresponding callback RPCs Non-disruptive upgrades. When DD is undergoing an upgrade, the DD Boost server can send callback RPC message which instructs the DD Boost clients to either pause IOs or expect some wait duration since a DD upgrade is in progress.

Cache Refresh. DD Boost client caches multiple items for performance and optimization such as file handles and so forth. However, if something changed for a particular file or if the file is removed, directory level notification callback can be sent by the DDBoost server to notify clients to refresh its cache.

Managed File Replication (MFR) Status. The application uses dd_filecopy_* APIs for MFR operations. Once it starts filecopy, they poll for the status. When an application is polling. DD Boost client each time sends RPC to DD to find out the status. This can be avoided by having a callback that tells about the filecopy status.

Status map. DD (AoB) nodes can let the DD Boost client know about the current map and status of nodes if any is going up/down, etc.

Delegation. Delegation is similar to allowing clients to cache a file so that clients with large caches can do unlimited read/write cache. Delegation needs revoking from server side to handle various scenarios. This requires an ability for server to send a callback message back to client.

Updates availability. DD Boost server can send out a callback message to DD Boost client whenever a new library is available for upgrades.

QoS. In an embodiment, the DD Boost client uses 'n' times connections to do parallel reads for encrypted restore workflow. However, this can start taking up significant networking resources on the server-side. DD Boost server can send callback messages to back off or start throttling in case of resources on the server are getting consumed at a high-water mark level.

Idle file detection. DDFS can let the client know about idle files which are open for quite a long time but there is no further read/write activities happening. DDFS can ask clients to gracefully close those files Truly Dynamic Parameter changes on DD Boost client. There are certain parameters or variables that are tunable for the DD Boost client and they can be controlled via DDR. While changing the parameter on DDR can be sent back to DD Boost client or multiple clients via server-initiated communication channel without needing to wait for new connection or client side reboot. One use case is to control log levels. Another use case can be to dump precert logs or FISL logs whenever something fails on the client.

In an embodiment, a method includes: receiving, at a client-side deduplication library from a backup application at a client, a job request for a file-copy operation involving one or more files managed by a backup server; establishing a server-initiated communication channel between the backup server and client-side deduplication library; registering a callback from the backup application specifying one or more types of status updates that the application wishes to receive; directing the backup server to start a job for the file-copy operation; receiving, over the server-initiated communication channel, a status update on the job from the backup server without having to prompt the backup server for the status update; determining whether the status update is a type of the one or more types of status updates that the backup application wishes to receive; when the status update is of the type that the backup application wishes to receive, calling the callback to notify the backup application of the status update; and when the status update is not of the type that the backup application wishes to receive, not calling the callback.

The method may include persisting, at the backup server, details about the job, the details comprising identifiers associated with the client, job, and the one or more files.

The method may include upon the backup server restarting after a crash, reconnecting to the backup server; receiving, from the backup server, details about the job that was persisted at the backup server before the crash of the backup server; and calling the callback to inform the backup application that the job should be restarted.

The method may include while the client-side deduplication library is recovering from a crash, continuing, by the backup server, to process the job; upon the client-side deduplication library recovering from the crash, reconnecting to the backup server and reestablishing the server-initiated communication channel; and receiving, over the reestablished server-initiated communication channel, another status update on the job from the backup server without having to prompt the backup server for the status update.

In an embodiment, a first type status update indicates that the backup application wishes to receive status updates at periodic intervals while the job is in progress, and a second type of status update indicates that the backup application wishes to receive a status update when the job has been completed. In an embodiment, the callback is registered before the backup server starts the job for the file-copy operation.

In another embodiment, there is a system comprising: a processor; and memory configured to store one or more sequences of instructions which, when executed by the processor, cause the processor to carry out the steps of: receiving, at a client-side deduplication library from a backup application at a client, a job request for a file-copy operation involving one or more files managed by a backup server; establishing a server-initiated communication channel between the backup server and client-side deduplication library; registering a callback from the backup application specifying one or more types of status updates that the application wishes to receive; directing the backup server to start a job for the file-copy operation; receiving, over the server-initiated communication channel, a status update on the job from the backup server without having to prompt the backup server for the status update; determining whether the status update is a type of the one or more types of status updates that the backup application wishes to receive; when the status update is of the type that the backup application wishes to receive, calling the callback to notify the backup application of the status update; and when the status update is not of the type that the backup application wishes to receive, not calling the callback.

In another embodiment, there is a computer program product, comprising a non-transitory computer-readable medium having a computer-readable program code embodied therein, the computer-readable program code adapted to be executed by one or more processors to implement a method comprising: receiving, at a client-side deduplication library from a backup application at a client, a job request for a file-copy operation involving one or more files managed by a backup server; establishing a server-initiated communication channel between the backup server and client-side deduplication library; registering a callback from the backup application specifying one or more types of status updates that the application wishes to receive; directing the backup server to start a job for the file-copy operation; receiving, over the server-initiated communication channel, a status update on the job from the backup server without having to prompt the backup server for the status update; determining whether the status update is a type of the one or more types of status updates that the backup application wishes to receive; when the status update is of the type that the backup application wishes to receive, calling the callback to notify the backup application of the status update; and when the status update is not of the type that the backup application wishes to receive, not calling the callback.

Figure 13:
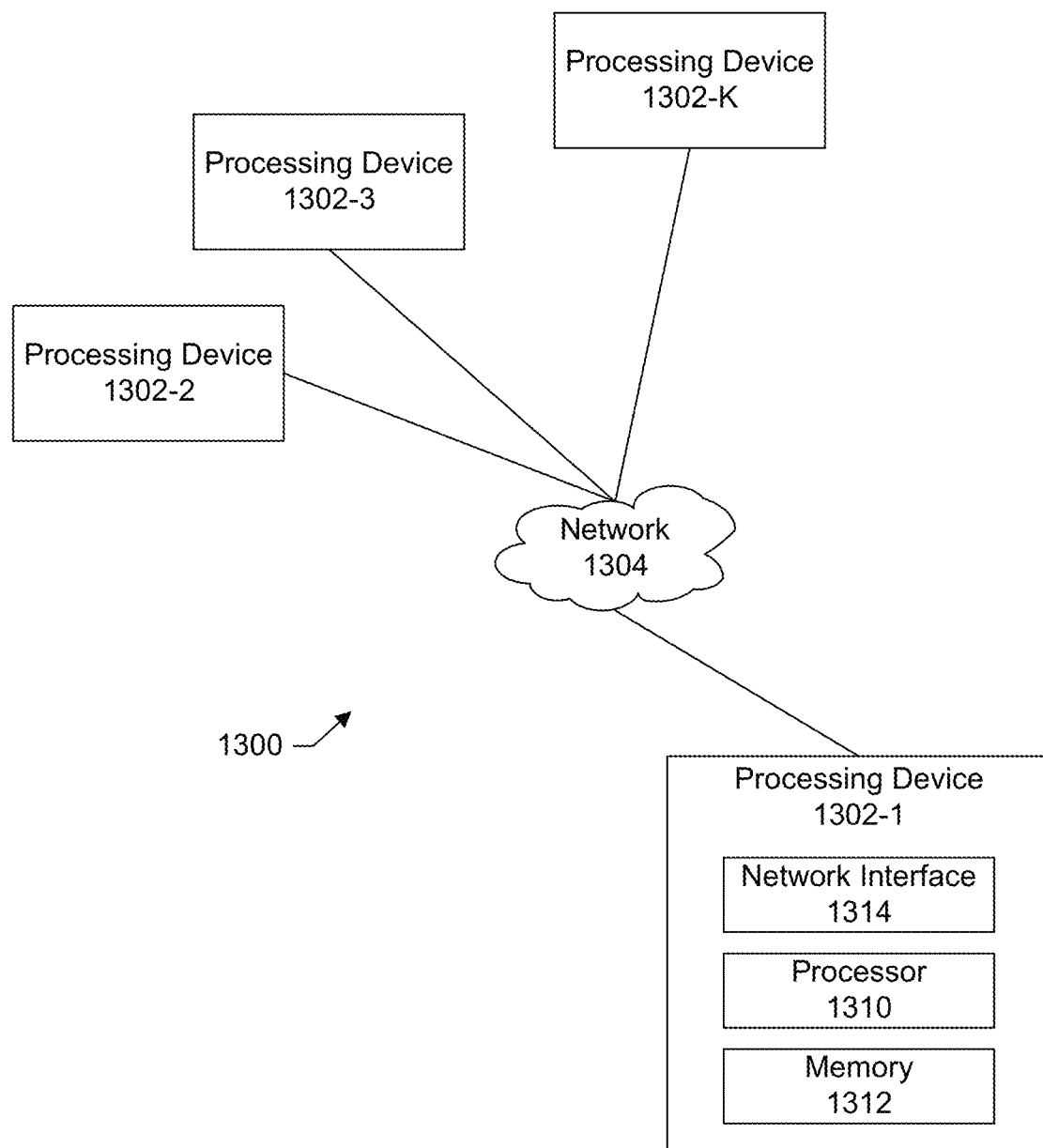
FIG. 13 shows a block diagram of a processing platform that may be utilized to implement at least a portion of an information processing system, according to one or more embodiments.

FIG. 13 shows an example of a processing platform 1300 that may include at least a portion of the information handling system shown in FIG. 1. The example shown in FIG. 13 includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 14:
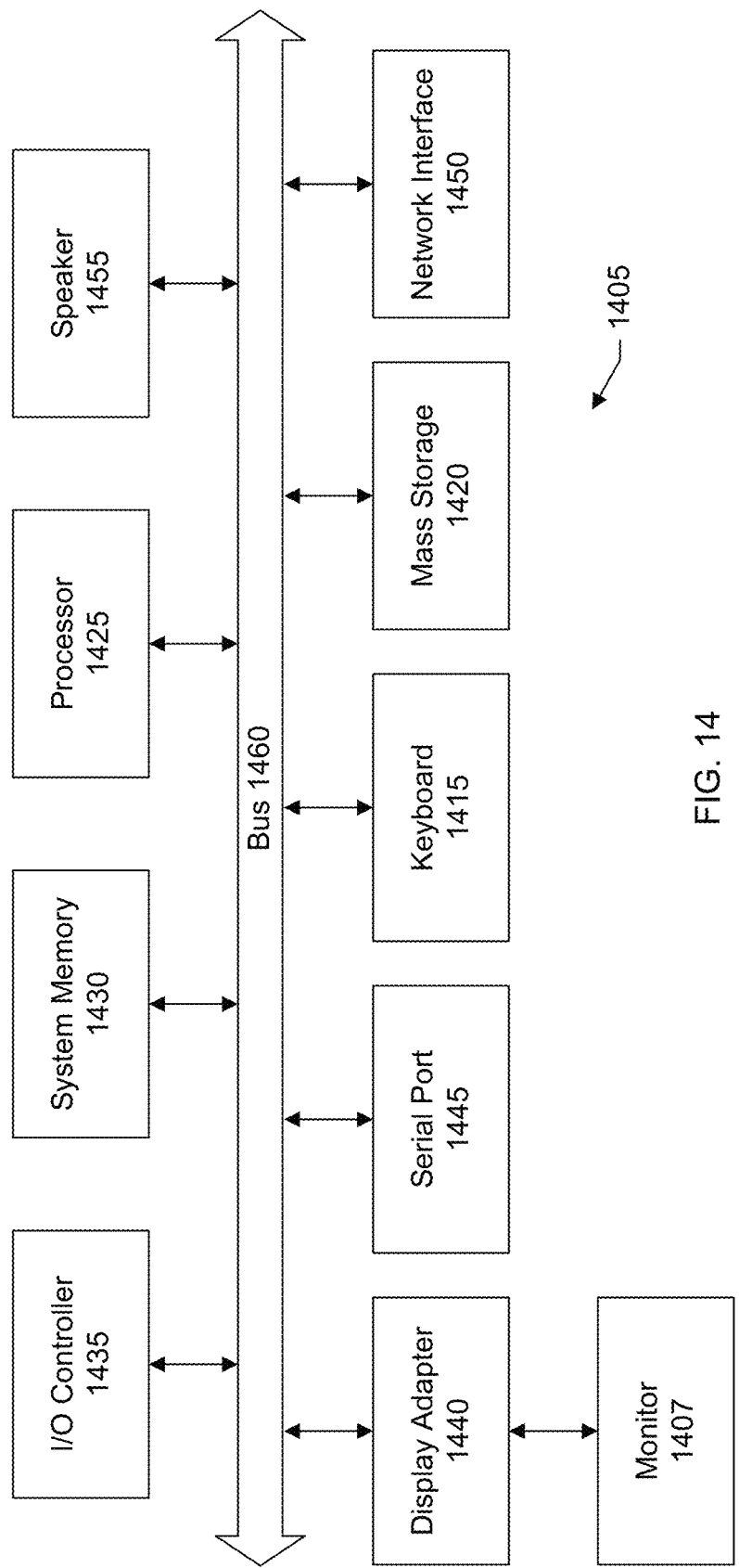
FIG. 14 shows a block diagram of a computer system suitable for use with the system, according to one or more embodiments.

FIG. 14 shows a system block diagram of a computer system 1405 used to execute the software of the present system described herein. The computer system includes a monitor 1407, keyboard 1415, and mass storage devices 1420. Computer system 1405 further includes subsystems such as central processor 1425, system memory 1430, input/output (I/O) controller 1435, display adapter 1440, serial or universal serial bus (USB) port 1445, network interface 1450, and speaker 1455. The system may also be used with computer systems with additional or fewer subsystems. For example, a computer system could include more than one processor 1425 (i.e., a multiprocessor system) or a system may include a cache memory.

Arrows such as 1460 represent the system bus architecture of computer system 1405. However, these arrows are illustrative of any interconnection scheme serving to link the subsystems. For example, speaker 1455 could be connected to the other subsystems through a port or have an internal direct connection to central processor 1425. The processor may include multiple processors or a multicore processor, which may permit parallel processing of information. Computer system 1405 shown in FIG. 14 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®, family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving, at a client-side deduplication library from a backup application at a client, a job request for a file-copy operation involving one or more files managed by a backup server;
establishing a server-initiated communication channel between the backup server and client-side deduplication library;
registering a callback from the backup application specifying one or more types of status updates that the application is to receive;
directing the backup server to start a job for the file-copy operation;
receiving, over the server-initiated communication channel, a status update on the job from the backup server without having to prompt the backup server for the status update;
determining whether the status update is a type of the one or more types of status updates that the backup application is to receive;
when the status update is of the type that the backup application is to receive, calling the callback to notify the backup application of the status update; and
when the status update is different from the type that the backup application is to receive, withholding calling the callback.

2. The method of claim 1 further comprising:
persisting, at the backup server, details about the job, the details comprising identifiers associated with the client, job, and the one or more files.

3. The method of claim 2 further comprising:
upon the backup server restarting after a crash, reconnecting to the backup server;
receiving, from the backup server, details about the job that was persisted at the backup server before the crash of the backup server; and
calling the callback to inform the backup application to restart the job.

4. The method of claim 2 further comprising:
while the client-side deduplication library is recovering from a crash, continuing, by the backup server, to process the job;
upon the client-side deduplication library recovering from the crash, reconnecting to the backup server and reestablishing the server-initiated communication channel; and
receiving
receiving, over the reestablished server-initiated communication channel, another status update on the job from the backup server without having to prompt the backup server for the status update.

5. The method of claim 1 wherein a first type status update indicates that the backup application is to receive status updates at periodic intervals while the job is in progress, and a second type of status update indicates that the backup application is to receive a status update when the job has been completed.

6. The method of claim 1 wherein the callback is registered before the backup server starts the job for the file-copy operation.

7. A system comprising: a processor; and memory configured to store one or more sequences of instructions which, when executed by the processor, cause the processor to carry out the steps of:
receiving, at a client-side deduplication library from a backup application at a client, a job request for a file-copy operation involving one or more files managed by a backup server, both the client-side deduplication library and the backup application being installed at the client;
establishing a server-initiated communication channel between the backup server and client-side deduplication library;
registering a callback from the backup application specifying one or more types of status updates that the application is to receive;
directing the backup server to start a job for the file-copy operation;
receiving, over the server-initiated communication channel, a status update on the job from the backup server without having to prompt the backup server for the status update;
determining whether the status update is a type of the one or more types of status updates that the backup application is to receive;
when the status update is of the type that the backup application is to receive, calling the callback to notify the backup application of the status update; and
when the status update is different from the type that the backup application is to receive, withholding calling the callback.

8. The system of claim 7 wherein the processor further carries out the step of:
persisting, at the backup server, details about the job, the details comprising identifiers associated with the client, job, and the one or more files.

9. The system of claim 8 wherein the processor further carries out the steps of:
upon the backup server restarting after a crash, reconnecting to the backup server;
receiving, from the backup server, details about the job that was persisted at the backup server before the crash of the backup server; and
calling the callback to inform the backup application to restart the job.

10. The system of claim 8 wherein the processor further carries out the steps of:
while the client-side deduplication library is recovering from a crash, continuing, by the backup server, to process the job;
upon the client-side deduplication library recovering from the crash, reconnecting to the backup server and reestablishing the server-initiated communication channel; and
receiving, over the reestablished server-initiated communication channel, another status update on the job from the backup server without having to prompt the backup server for the status update.

11. The system of claim 7 wherein a first type status update indicates that the backup application is to receive status updates at periodic intervals while the job is in progress, and a second type of status update indicates that the backup application is to receive a status update when the job has been completed.

12. The system of claim 7 wherein the callback is registered before the backup server starts the job for the file-copy operation.

13. A computer program product, comprising a non-transitory computer-readable medium having a computer-readable program code embodied therein, the computer-readable program code adapted to be executed by one or more processors to implement a method comprising:
receiving, at a client-side deduplication library from a backup application at a client, a job request for a file-copy operation involving one or more files managed by a backup server, both the client-side deduplication library and the backup application being installed at the client;
establishing a server-initiated communication channel between the backup server and client-side deduplication library;
registering, at the client-side deduplication library installed at the client, a callback from the backup application, the callback comprising options that allow the backup application to specify one or more types of status updates that the application is to receive;
directing the backup server to start a job for the file-copy operation;
receiving, over the server-initiated communication channel, a status update on the job from the backup server without having to prompt the backup server for the status update;
determining whether the status update is a type of the one or more types of status updates that the backup application is to receive according to the options specified by the backup application;
when the status update is of the type that the backup application is to receive, calling the callback to notify the backup application of the status update; and
when the status update is different from the type that the backup application is to receive, withholding calling the callback.

14. The computer program product of claim 13 wherein the method further comprises:
persisting, at the backup server, details about the job, the details comprising identifiers associated with the client, job, and the one or more files.

15. The computer program product of claim 14 wherein the method further comprises:
upon the backup server restarting after a crash, reconnecting to the backup server;
receiving, from the backup server, details about the job that was persisted at the backup server before the crash of the backup server; and
calling the callback to inform the backup application to restart the job.

16. The computer program product of claim 14 wherein the method further comprises:
while the client-side deduplication library is recovering from a crash, continuing, by the backup server, to process the job;

upon the client-side deduplication library recovering from the crash, reconnecting to the backup server and reestablishing the server-initiated communication channel; and receiving, over the reestablished server-initiated communication channel, another status update on the job from the backup server without having to prompt the backup server for the status update.

17. The computer program product of claim 13 wherein a first type status update indicates that the backup application is to receive status updates at periodic intervals while the job is in progress, and a second type of status update indicates that the backup application is to receive a status update when the job has been completed.

18. The computer program product of claim 13 wherein the callback is registered before the backup server starts the job for the file-copy operation.

19. The computer program product of claim 13 wherein the options comprise a first option that allows the backup application to indicate a frequency at which the status updates are sent.

* * * * *